United States Patent [19]

Nagata

Patent Number: 5,438,105
Date of Patent: Aug. 1, 1995

[54] POLYAMIC ACID COMPOSITE, POLYIMIDE COMPOSITE AND PROCESSES FOR PRODUCING THE SAME

[75] Inventor: Yasuhisa Nagata, Shizuoka, Japan

[73] Assignee: Toho Rayon Co., Ltd., Tokyo, Japan

[21] Appl. No.: 202,872

[22] Filed: Feb. 28, 1994

Related U.S. Application Data

[63] Continuation-in-part of Ser. No. 691,884, Apr. 26, 1991, abandoned.

[30] Foreign Application Priority Data

| Apr. 27, 1990 | [JP] | Japan | 2-112540 |
| Apr. 27, 1990 | [JP] | Japan | 2-112541 |
| Aug. 1, 1990 | [JP] | Japan | 2-204171 |
| Aug. 1, 1990 | [JP] | Japan | 2-204172 |

[51] Int. Cl.$^6$ ............................ C08L 79/08
[52] U.S. Cl. ...................... 525/436; 525/433; 525/434; 525/432; 525/425; 525/184; 525/183
[58] Field of Search ............ 525/432, 433, 434, 436, 525/425, 184, 183

[56] References Cited

FOREIGN PATENT DOCUMENTS

| 0274603 | 7/1988 | European Pat. Off. . |
| 0289695 | 11/1988 | European Pat. Off. . |
| 0418889 | 3/1991 | European Pat. Off. . |
| 50-02003 | 1/1975 | Japan . |
| 0231758 | 10/1985 | Japan . |

OTHER PUBLICATIONS

CA 44495f (72)(10).
CA 6438w (77)(2).
CA 44352g (72)(10).
CA 136764v (78)(22).

Primary Examiner—James J. Seidleck
Assistant Examiner—I. Zemel
Attorney, Agent, or Firm—Sughrue, Mion, Zinn, Macpeak & Seas

[57] ABSTRACT

A polyamic acid composite comprising i) a polyamic acid having three dimensional network molecular structure obtained by a ring-opening polyaddition reaction of a tetracarboxylic acid dianhydride with an aromatic diamine and a tri- or tetramino compound and ii) (a) a high polymer component having a different molecular structure from the polyamic acid, which is dispersed in the three dimensional network molecular structure of the polyamic acid and of which molecular chains are interpenetrated with molecular chains of the polyamic acid or (b) a curable resin composition which is dispersed in the three dimensional network molecular structure of the polyamic acid and which is capable of forming a cured resin of which molecular chains are interpenetrated with molecular chains of the polyamic acid, and a polyimide composite obtained from the polyamic acid composite, and process for production thereof.

20 Claims, 3 Drawing Sheets

POLYAMIC ACID COMPOSITE, POLYIMIDE COMPOSITE AND PROCESSES FOR PRODUCING THE SAME

This is a Continuation-in-Part of application Ser. No. 07/691,884 filed Apr. 26, 1991, now abandoned.

FIELD OF THE INVENTION

The present invention relates to a new polyamic acid composite which comprises a polyamic acid having a three dimensional network molecular structure and another high polymer component or a curable resin composition. In the former polyamic acid composite, molecular chains of the polyamic acid having a three dimensional network molecular structure are interpenetrated with molecular chains of the other high polymer component. The present invention further relates to a new polyimide composite obtained from the polyamic acid composite.

BACKGROUND OF THE INVENTION

Polyimide resins are widely used in the fields of electrical and electronic materials, adhesives, coatings, composite materials, and fiber and film materials, because they are excellent in heat resistance, wear resistance, chemical resistance, electrical insulating properties and mechanical characteristics.

Polyimide resin films are also used in various ways as coating materials for electric wires, cables and wires and as insulating materials for transformers and printed-circuit boards, because of their excellent characteristcs.

Many patents exist which disclose a process for the production of a polyimide resin from a polyamic acid as a precursor in which the polyamic acid is prepared by a polyaddition reaction of a tetracarboxylic acid dianhydride and an aromatic diamine in an organic solvent and then subjected to dehydration and cyclization by means of heating or a chemical dehydrating using a dehydrating agent.

In general, a polyamic acid as a precursor of a polyimide resin is prepared by means of polyaddition of a tetracarboxylic acid dianhydride and an aromatic diamine in an organic solvent with a polymer concentration of 5 to 20% by weight to obtain a high molecular weight polyamic acid homogeneously dissolved in the organic solvent. A film or a molded material is then prepared by removing the organic solvent from the thus prepared polyamic acid solution. Thereafter, the film or molded material is subjected to dehydration and cyclization by means of a high temperature treatment or a chemical treatment to obtain a molded polyimide material.

A simplified process has also been disclosed in, for example, JP-A-57-109614 (the term "JP-A" as used herein means an "unexamined published Japanese patent application") in which a polyamic acid dissolved in an organic solvent is mixed with a dehydrating agent and a catalyst and then the mixture is dried to obtain a polyimide film directly from the thus formed polyamic acid gel film.

With regard to a blend of a polyimide with another high polymer component, a composition in which a polyimide was mixed with a thermoplastic resin such as a polysulfone for the purpose of improving moldability has been disclosed, for example, in JP-A-63-304054 and JP-A-63-305166.

SUMMARY OF THE INVENTION

An object of the present invention is to provide a new polyamic acid composite having improved and new characteristics, in which molecular chains of a three dimensional network molecular structure (high molecular gel structure) of a polyamic acid are interpenetrated with molecular chains of another high polymer (hereinafter referred to as a high polymer component).

A second object of the present invention is to provide a new polyamic acid composite in which a curable resin composition is dispersed in the molecular structure of the polyamic acid.

A third object of the present invention is to provide a polyimide composite obtained from the polyamic acid containing the high polymer component or the curable resin composition.

A fourth object of the present invention is to provide processes for the production of the polyamic acid composite and the production of the polyimide composite from the polyamic acid composite.

Other objects and advantages of the present invention will be made apparent as the description progresses.

The polyamic acid composite of the present invention comprises i) a polyamic acid having a three dimensional network molecular structure obtained by a ring-opening polyaddition reaction of a tetracarboxylic acid dianhydride with an aromatic diamine and a tri- or tetraamino compound (hereinafter referred to as polyamino compound) and ii) (a) a high polymer (hereinafter referred to as a high polymer) component having a different molecular structure from the polyamic acid, which is dispersed in the three dimensional network molecular structure of the polyamic acid and where the molecular chains thereof are interpenetrated with molecular chains of the polyamic acid or (b) a curable resin composition which is dispersed in the three dimensional network molecular structure of the polyamic acid and which is capable of forming a cured resin where the molecular chains thereof are interpenetrated with molecular chains of the polyamic acid.

The polyimide composites containing the high polymer can be obtained by imidization of the polyamic acid in the composite containing the high polymer.

The polyimide composite containing a curable resin composition can be obtained by imidization of the polyamic acid in the composite containing the curable resin composition.

DETAILED DESCRIPTION OF THE INVENTION

Figure 1:
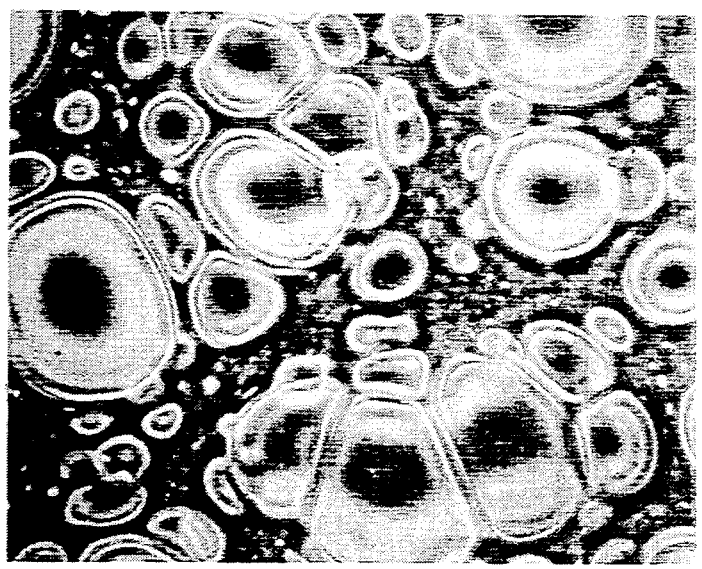
FIG. 1 is a photograph of a film of a polyamic acid composite (interpenetrating polymer network molecular structure) prepared in Example 1 of the present specification, taken using a phase contrast microscope at a magnification of 200.

The polyamic acid composite of the present invention can be obtained by forming a gel of the polyamic acid containing the high polymer.

Examples of the methods for the preparation of the composite include the followings:

i) The high polymer may be introduced to the reaction system for production of the polyamic acid composite at any stage before, during or after completion of the ring-opening polyaddition reaction of the tetracarboxylic acid with the aromatic diamine and the polyamino compound to form the polyamic acid or at any stage before, during or after completion of the cross-linking reaction of the polyamic acid to form a gel.

The high polymer may be incorporated as a solid or as a solution thereof, into the reaction solution of a tetracarboxylic acid, an aromatic diamine and a polyamino compound before starting the ring-opening polyaddition reaction or during the reaction before the reaction mixture becomes a gel. A solution of the high polymer may also be impregnated into the gel of the polyamic acid.

ii) The high polymer may be introduced to the reaction system for the production of the polyamic acid composite by conducting polymerization of the monomer(s) for the high polymer at any stage before, during or after completion of the polyaddition reaction or before, during or after completion of the cross-linking reaction.

According to a preferred embodiment of the process of the present invention, a polyamic acid composite is prepared by the following illustrative steps.

(1) Preparation of a polyamic acid solution.

(2) Dissolution or dispersion of a high polymer component in a solvent.

(3) Mixing of the polyamic acid solution with the high polymer component solution or dispersion.

(4) Cross-linking reaction of the polyamic acid component to complete formation of a composite gel.

(5) Removal of the solvent in the case the composite gel is used in dry form.

The polyamic acid solution is prepared from a tetracarboxylic acid dianhydride, an aromatic diamine and a polyamino compound as the main components by means of a ring-opening polyaddition reaction.

A polyamic acid solution uniformly dissolved in an organic solvent is obtained as an intermediate product from a tetracarboxylic acid dianhydride, an aromatic diamine and a polyamino compound by means of a ring-opening polyaddition reaction. When unreacted functional groups in the intermediate polyamic acid are allowed to undergo a gradual cross-linking reaction in the organic solvent, the polyamic acid forms a three dimensional network molecular structure and subsequently turns into a gel. In this way, a polyamic acid high molecular weight gel containing an organic solvent is obtained. The polyamic acid in the gel form usually has a molecular weight of about 10,000 to 300,000.

The high polymer component is preferably added to a reaction mixture for production of the polyamic acid solution which is not yet made into a gel form. It is preferred that the reaction mixture has a viscosity of not more than 500 poise (at 25° C.). The reaction mixture undergoes a polyaddition reaction and cross-linking reaction to obtain a gel of the polyamic acid.

Before the completion of the gelation, preferably before starting the gelation, the mixed solution of the second component with the polyamic acid constituents may be poured into a mold or cast on a planar support (such as glass plate) to form a desired molded material such as a film or filaments.

Unreacted functional groups in the polyamic acid are allowed to undergo a gradual cross-linking reaction in the organic solvent by letting the solution stand for at least 1 minute at a temperature of from 0° to 100° C. In this way, constituents of the polyamic acid form a three dimensional network molecular structure and, as a result, a polyamic acid high molecular gel containing an organic solvent and a second component (i.e., the high polymer or the curable resin composition) is obtained.

Typical examples of the tetracarboxylic acid dianhydride used in the present invention are a tetracarboxy benzene dianhydride, a tetracarboxy dianhydride of a compound having 2 to 5 condensed benzene rings, compounds represented by formula (I), and substituted compounds thereof:

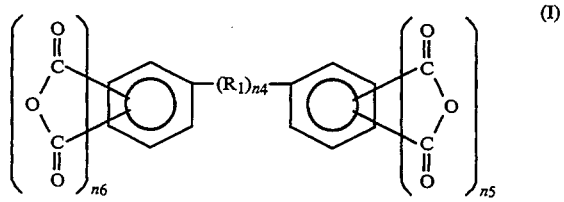

(I)

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group; $n_4$ is 0 or 1; $n_5$ is 0 or 1; and $n_6$ represents 1 or 2, provided that the sum of $n_5$ and $n_6$ is 2.

Illustrative examples of tetracarboxylic acid dianhydrides eligible for use in the present invention include pyromellitic acid dianhydride, 3,3',4,4'-benzophenonetetracarboxylic acid dianhydride, 3,3',4,4'-biphenyltetracarboxylic acid dianhydride, 2,3,3',4,'-biphenyltetracarboxylic acid dianhydride, 2,2',3,3'-biphenyltetracarboxylic acid dianhydride, 2,2',6,6'-biphenyltetracarboxylic acid dianhydride, 2,3,6,7-naphthalenetetracarboxylic acid dianhydride, 1,2,5,6-naphthalenetetracarboxylic acid dianhydride, 2,2-bis-(3,4-dicarboxyphenyl)propane dianhydride, bis(3,4-dicarboxyphenyl)sulfone dianhydride, bis(3,4-dicarboxyphenyl) ether dianhydride, 3,4,9,10-perylenetetracarboxylic acid dianhydride, naphthalene-1,2,4,5-tetracarboxylic acid dianhydride, naphthalene-1,4,5,8-tetracarboxylic acid dianhydride, benzene-1,2,3,4-tetracarboxylic acid dianhydride and the like. Also useful are tetracarboxylic acid dianhydrides having relatively large molecular weights in which each molecule contains certain groups such as amido, ester sulfone, ether, sulfone, methylene, propylene, phenylene, imidazole, thiazole and like groups, as well as tetracarboxylic acid dianhydrides containing halogen atoms such as fluorine in the structure. These compounds may be used alone or as a mixture of two or more thereof.

Typical examples of the aromatic diamine used in the present invention are a phenylene diamine, a diamino pyridine, a diamino compound having 2 to 8 condensed benzene rings, dihydrazide, compounds represented by formula (II), and substituted compounds thereof:

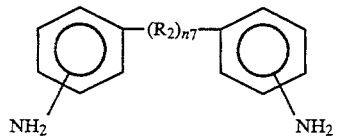
(II)

wherein $R_2$ represents —O—, —CO—, —SO$_2$—, —SO—, a phenylene group, an alkylene group, a phenylene alkylene group, a phenylene dialkylene group, or

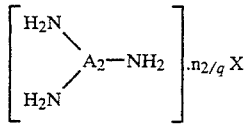

$n_7$ is 0 or 1; $R_3$ represents —O—, —CO—, —SO$_2$—, —SO—, a phenylene group, an alkylene group, a phenylene alkylene group, or a phenylene dialkylene group; and $n_8$ is 0 or 1.

Illustrative examples of aromatic diamines reacted with the above tetracarboxylic acid dianhydrides include metaphenylenediamine, paraphenylenediamine, 4,4'-diaminodiphenylpropane, 4,4'-diaminodiphenylmethane, 3,3'-diaminodiphenylmethane, 4,4'-diaminodiphenylsulfide, 4,4'-diaminodiphenylsulfone, 3,3'-diaminodiphenylsulfone, 3,4'-diaminodiphenylsulfone, 4,4'-diaminodiphenyl ether, 3,3'-diaminodiphenyl ether, 3,4'-diaminodiphenyl ether, 4,4'-diaminobenzophenone, 3,3'-diaminodiphenyl diaminobenzophenone, 2,2'-bis(4-aminophenyl)propane, benzidine, 3,3'-diaminobiphenyl, 2,6-diaminopyridine, 2,5-diaminopyridine, 3,4-diaminopyridine, bis[4-(4-aminophenoxy) phenyl]sulfone, bis[4-(3-aminophenoxy)phenyl]sulfone, bis[4-(4-aminophenoxy)phenyl]ether, bis[4-(3-aminophenoxy)phenyl]ether, 2,2'-bis[4-(4aminophenoxy)phenyl]propane, 2,2'-bis[4-(3-aminophenoxy) phenyl]propane, 4,4'-bis(4-aminophenoxy)biphenyl, 1,4bis(4-aminophenoxy)benzene, 1,3-bis(4-aminophenoxy)benzene, 2,2 '-bis[4-(3-aminophenoxy)phenyl]hexafluoropropane, 1,5-diaminonaphthalene, 2,6-diaminonaphthalene and the like and derivatives thereof. Also useful are dihydrazide compounds such as isophthalic acid dihydrazide. These compounds may be used alone or as a mixture of two or more.

Typical examples of polyamino compounds used in the present invention are represented by formula (III) or (IV):

$$\begin{bmatrix} H_2N & NH_2 \\ & A_1 & \\ H_2N & NH_2 \end{bmatrix} \cdot n_{1/q} X$$ (III)

(IV)

wherein $A_1$ represents

$A_2$ represents

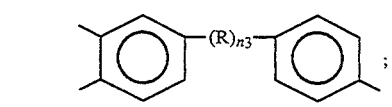

$n_1$ is 0 or an integer of 1 to 4; $n_2$ is 0 or an integer of 1 to 3; X represents an acid; q is the base number of the acid; R represents —O—, —CH$_2$—, —CO— or —SO$_2$—; and $n_3$ is 0 or 1. $A_1$ and $A_2$ may be substituted.

The acid represented by X in formulae (III) and (IV) may be either an organic or inorganic acid. Examples of the acid include p-toluenesulfonic acid, picric acid, and hydrochloric acid.

These compounds may be used either alone or as a mixture of two or more of them.

Illustrative examples of polyamino compounds for use in the present invention include 3,3',4,4'-tetraaminodiphenyl ether, 3,3',4,4'-tetraaminodiphenylmethane, 3,3',4,4'-tetraaminobenzophenone, 3,3',4,4-tetraaminodiphenylsulfone, 3,3',4,4'-tetraaminobiphenyl, 1,2,4,5-tetraaminobenzene, 3,3',4,-triaminodiphenyl ether, 3,3',4-triaminodiphenylmethane, 3,3',4-triaminobenzophenone, 3,3',4-triaminodiphenylsulfone, 3,3',4-triaminobiphenyl, 1,2,4-triaminobenzene and the like. Also useful are derivatives of the above compounds in which their functional groups are changed into the form of quaternary ammonium salts, such as 3,3',4,4'-tetraaminobiphenyl tetrachloride and the like. The quaternary ammonium salts may be used not only as hydrochlorides but also as sulfates or organic acid salts. Polyamino compound derivatives in which their functional groups are partially changed into quaternary ammonium salts may also be used. Some of the above compounds are available as hydrates which are also useful. The use of aliphatic polyamino compounds may also be possible. These polyamino compounds may be used alone or as a mixture of two or more thereof.

The substituent for compound represented by formulae (I) to (IV) should not adversely affect the polyaddition reaction and should not deteriorate characteristics of the products obtained therefrom. Examples of such substituents include an aliphatic group, and a halogen atom.

A high polymer component to be mixed with the polyamic acid composition preferably is selected from polymers which are at least soluble in organic solvents. According to the present invention, the high polymer component has a structure or has a carbon number different from that of the polyamic acid.

Typical examples of the high polymer component include polyamic acids, polyimides, polyamideimides, polyetherimides, polyethersulfones, polysulfones, polybenzimidazoles, polybenzoxazoles, polybenzothiazoles, polyamides, polypeptides, polyesters, polycarbonates and polyacrylonitriles and the like. Modified products and precursors of various polymers and oligomers are also useful as the high polymer component. These components may be used alone or as a mixture of two or more thereof.

A polyamic acid is obtained from at least one of tetracarboxylic acid dianhydrides, at least one of aromatic diamines and at least one of polyamino compounds by means of a ring opening polyaddition reaction and cross-linking reaction of the polyaddition product. Such a polyamic acid has a three dimensional network molecular structure, i.e., is a high polymer gel, which is possessed of a free-standing capability to keep its shape since it does not undergo flow even if it contains an organic solvent in a large amount.

Since each of the tetracarboxylic acid dianhydride, aromatic diamine and polyamino compound is used alone or as a mixture of two or more compounds, the resulting polymers include copolymers. A blend of polyamic acids may also be obtained in which a specific polyamic acid is mixed with another polyamic acid which is obtained from the same monomer components but at least one of its components is replaced by a different compound.

The polymerization reaction for the preparation of a polyamic acid from a tetracarboxylic acid dianhydride, an aromatic diamine and a polyamino compound as the main components may be carried out in an organic solvent at a temperature of from $-10°$ C. to $30°$ C., preferably from $-5°$ C. to $20°$ C., within a reaction time of 5 hours, preferably within 2 hours and usually at least 5 minutes. A reaction temperature lower than $-10°$ C. is not preferable, because not only does it require rather difficult handling and a special reaction means but also the reaction itself does not proceed appropriately in some cases. If the reaction temperature exceeds $30°$ C., the reaction mixture is quickly formed into a gel form within such a short time that a high polymer component blends with difficulty with the polyamic acid and, therefore, a homogeneous composite is hardly obtained in some cases.

The organic solvent for use in the polymerization reaction for the preparation of a polyamic acid from a tetracarboxylic acid dianhydride, an aromatic diamine and a polyamino compound as the main components should be inert in the reaction and should have the ability to dissolve the monomers and high polymer components. Typical examples of such organic solvents include N,N-dimethylformamide, N,N-dimethylacetamide, N,N-diethylformamide, N,N-diethylacetamide, dimethylsulfoxide, N-methyl-2-pyrrolidone, N,N-dimethylmethoxyacetamide, hexamethylphosphamide, pyridine, dimethylsulfone, tetramethylenesulfone, cresol, phenols such as phenol, xylenol and the like; and benzene, toluene, xylene, benzonitrile, dioxane, cyclohexane and the like. These solvents may be used alone or as a mixture of two or more thereof.

Reaction of a tetracarboxylic acid dianhydride with a polyamino compound may preferably be performed at a molar ratio of tetracarboxylic acid dianhydride/polyamine=(100)/(2–25), more preferably (100)/(4–15), though the optimum ratio may sometimes be slightly outside of these ranges, depending on the monomers used.

In general, when a polyamic acid is prepared from a tetracarboxylic acid dianhydride and an aromatic diamine, it is preferable to use these compounds in a molar ratio as close to stoichiometrically equivalent as possible to increase the molecular weight of the product. According to the process of the present invention, in order to obtain a polyamic acid composite having freestanding capability by increasing the degree of polymerization of the polyamic acid, it is necessary to adjust the tetracarboxylic acid dianhydride/aromatic diamine molar ratio to (100)/(50–100), the tetracarboxylic acid dianhydride/aromatic diamine/polyamino compound molar ratio to (100)/(50–100)/(2–25) and an equivalent ratio of the reactive groups in the tetracarboxylic acid dianhydride to those in the amines (an acid value/amine value ratio) to 0.95 to 1.05.

If monomers are mixed in an amount outside of these compositional ranges, the degree of polymerization of the polyamic acid may not be increased and the resulting composite may have inferior mechanical and like properties. In such instance, a portion of the monomers will remain unreacted in the polymer solution and exert a serious influence upon the properties of the composite obtained upon evaporation and drying of the polymer solution. If the amount of a polyamino compound is less than 2 mols per 100 mols of a tetracarboxylic acid dianhydride, polyamic acid components may not form a three dimensional network molecular structure and, therefore, a high polymer gel may not be obtained. If the amount of a polyamine is larger than 25 mols per 100 mols of a tetracarboxylic acid dihydride, the polyamic acid component forms a three dimensional network structure having too many crosslinking points which increases the brittleness, or decreases the strength, of the polyamic acid composite and polyimide composite obtained therefrom.

The reaction of a tetracarboxylic acid dianhydride with an aromatic diamine and a polyamine can be regarded as a reaction of a tetracarboxylic acid dianhydride with an amine. The reaction, therefore, can be effected by dissolving an aromatic diamine and a polyamino compound in an organic solvent and then adding a tetracarboxylic acid dianhydride to the solution under an inert atmosphere such as a nitrogen gas atmosphere. The tetracarboxylic acid dianhydride to be added to the solution may be either in a solid form or in a liquid form by dissolving it in appropriate solvent. The reaction may also be effected by adding an aromatic diamine and a polyamino compound to a solution of a tetracarboxylic acid dianhydride under an inert gas atmosphere.

A high polymer component having a different structure from the aforementioned polyamic acid may be dissolved in an appropriate solvent and then added to the aforementioned solution of reaction components or the polyamic acid solution to form a composite of the polyamic acid containing the high polymer component. When the thus mixed polyamic acid/high polymer component solution is kept at a temperature usually of from about $0°$ to $100°$ C., the solution achieves a gel form by a three dimensional cross-linking reaction of the polyamic acid component. In this way, a high polymer gel of a polyamic acid composite is formed.

For the purpose of obtaining an extremely uniform polyamic acid composite, it is desirable to mix a high polymer component with the polyamic acid solution before the polyamic acid forms a three dimensional network molecular structure to be a free-standing composite gel.

According to the process of the present invention, a unique interpenetrating polymer network molecular structure is obtained, because gelation occurs in a mixed solution of a polyamic acid and a high polymer component and molecular chains of both components are uniformly entangled in the solution, and in such a state a high polymer gel is formed. In the gel the high polymer chains are interpenetrated into the polyamic acid network molecular structure. Because of the unique structure thereof, the thus obtained polyamic acid composite also has unique properties.

Polyamic acids and polyimides for use as the high polymer component include all polymers which can be formed through the combination of the aforementioned typical examples of tetracarboxylic acid dianhydrides and aromatic diamines. Typical examples of commercially available high polymer components include LARC-TPI (manufactured by Mitsui Toatsu Chemicals, Inc.) and the like as polyimides, Torlon (manufactured by Mitsubishi Chemical Industries Ltd.) and the like as polyamideimides, ULTEM (manufactured by Japan G E Plastics Co., Ltd.) and the like as polyetherimides, Victrex PES (manufactured by ICI) and the like as polyethersulfones, UDEL P-1700 (manufactured by Amoco) and the like as polysulfones, PBI (manufactured by Celanese Corp.) and the like as polybenzimidazoles, ZYTEL (manufactured by Du Pont) and the like as polyamides and Idemitsu Polycarbonate (manufactured by Idemitsu Petrochemical Co., Ltd.) and the like as the source of polycarbonates. (Chemical formulae of these polymers are shown hereinafter.)

The high polymer component is preferably be used in an amount of about 1 to 80% by weight based on the polyamic acid composite.

If the amount of the high polymer component in the polyamic acid composite of the present invention is less than about 1% by weight, no significant effects are obtained from that component with respect to improving physical properties such as toughness and functional properties such as material separation capacity. An amount of the high polymer component of larger than 80% by weight results in the formation of an imperfect three dimensional network molecular structure of the polyamic acid component which will not yield a free-standing high polymer gel, thus spoiling the effect of the interpenetrating polymer network structure.

Illustrative examples of solvents having the ability to dissolve high polymer components include: amide-based solvents such as N,N-dimethylformamide, N,N-dimethylacetamide and the like; phenols such as cresol, phenol, xylenol and the like; sulfone-based solvents such as dimethylsulfone, tetramethylenesulfone, dimethylsulfoxide and the like; hydrocarbons such as benzene, toluene, xylene, cyclohexane and the like; chlorine-based solvents such as methylene chloride, dichloroethane and the like; and ketones, alcohols, N-methyl-2-pyrrolidone, benzonitrile, pyridine, dioxane, polyphosphoric acid, N,N-diethylaniline and the like. These solvents may be used alone or as a mixture of two or more thereof. If a high polymer component has low solubility in any of these solvents, its solution may be prepared at a high temperature under high pressure.

A polyamic acid composite in which molecular chains of a three dimensional network structure (high molecular gel structure) of a polyamic acid obtained from a tetracarboxylic acid dianhydride, an aromatic diamine and a polyamine are interpenetrated with molecular chains of another high polymer component may be prepared for example by either of the following two processes.

(1) A process for the formation of a polyamic acid composite having an interpenetrating polymer network molecular structure (a polyamic acid/high polymer component composite structure) containing less than 97% by weight of an organic solvent based on the weight of the composite, which comprises the steps of;
  (a) preparing a polyamic acid solution obtained by a reaction of a tetracarboxylic acid dianhydride, an aromatic diamine and a polyamino compound as the main components,
  (b) mixing a high polymer component in a solid state or dissolved in an organic solvent with the solution of step (a) which is not yet in a gel form, and
  (c) completing gelling of the polyamic acid ingredients in the mixture of step (b).

(2) A process for the formation of a polyamic acid composite which comprises dissolving a tetracarboxylic acid dianhydride, an aromatic diamine and a polyamine in an organic solvent solution of a high polymer component.

In addition to the above processes, many other methods are useful such as a process in which dissolution of a solid high polymer component and the reaction for production of a polyamic acid are performed simultaneously and a process in which a high polymer component is added to a polyamic acid solution during the reaction for production of the polyamic acid. Any of these processes may be applicable practically, provided that it can produce a condition in which a high polymer compound is present as a mixture in a three dimensional network molecular structure of a polyamic acid.

An organic solvent for use in the mixing of a polyamic acid obtained from a tetracarboxylic acid dianhydride, an aromatic diamine and a polyamino compound with a high polymer component may be used in such an amount that the content of the resulting polyamic acid composite (a polyamic acid/high polymer component composite) in the organic solvent can be adjusted within the range of from about 3 to 40% by weight, preferably from about 5 to 30% by weight, from the point of view of handling. When the content of the polyamic acid composite is lower than about 3% by weight, this would result in insufficient in crosslinking of the obtained product, and if it is higher than about 40% by weight this would render mixing of the polyamic acid and high polymer component rather difficult because of the too high solid contents.

According to the process of the present invention, mixing of a polyamic acid and a high polymer component progresses relatively homogeneously when they are used as solutions, which renders possible preparation of a polyamic acid composite having a three dimensional network molecular structure that can keep free-standing capability keeping its gel shape and which retains the solvent even in the case of a high mixing ratio of the high polymer component.

Depending on the kind of high polymer components or their preparation conditions, some high polymer components may not dissolve in an organic solvent but will remain in a swollen or dispersed state. In such instance, these insoluble components remain in the resulting polyamic acid composite as relatively large domain structures, thus spoiling the interpenetrating polymer network molecular structure (IPN structure) of the composite in which molecular chains of a three dimensional network molecular structure of a polyamic acid are interpenetrated with molecular chains of the high polymer component.

When the compatibility of a polyamic acid to a high polymer component is not good, phase separation occurs after mixing of the solutions of these components or during the step of removal of the solvent, thus resulting in the formation of a non-uniform composite. Even in such a case, a three dimensional network molecular structure (gel) of a polyamic acid composite having free-standing capability can be prepared. In the case of such polyamic acid composites, it seems that at least the polyamic acid ingredient can form a three-dimensionally continued phase even if there is phase separation, because these ingredients form a three dimensional network molecular structure (gel) in the course of composite preparation in an organic solvent.

The curable resin composition which is incorporated into the polyamic acid as a second component is a uncured resin composition which comprises a reactive monomer and/or oligomer as main constituents, the reactive constituents being capable of undergoing curing under exposure to heat, light or electron beams.

The curable resin composition is preferably used in an amount of about 1 to 80% by weight based on the polyamic acid composite. The reason for the selection of this range of amount is the same as that for the high polymer.

The polyamic acid composite containing a curable resin composition is preferably produced by mixing the polyamic acid solution with an uncured curable resin composition, or by impregnating a solution of an uncured curable resin composition into a polyamic acid gel.

By removing solvents from the composite and performing dehydration and cyclization of the polyamic acid constituents and curing of the uncured curable resin component, a polymer composite of a polyimide and a cured resin component is obtained which has excellent properties specific to the polyimide such as a high heat resistance and also has excellent characteristics inherent to the cured resin component formed.

A preferred method for production of a polyamic acid composite containing a curable resin composition is shown below.

(1) The composite is prepared from a polyamic acid solution and a resin composition which comprises a reactive monomer and/or oligomer as the source of an uncured curable resin composition. In this instance, forming the composite of the polyamic acid with the uncured curable resin component is effected by allowing the polyamic acid to undergo polyaddition reaction with the uncured curable resin component which has been dissolved in an organic solvent in advance or by adding the uncured curable resin component to the polyamic acid solution prepared by a polyaddition reaction but not yet made into a gel form.

(2) Before it starts gelation, the thus prepared mixed solution of the uncured curable resin composition with the polyamic acid is cast on a support or poured into a mold to form a desired molded material such as a film.

(3) The thus cast or poured solution is allowed to stand for at least 1 minute at a temperature of from 0° to 100° C. to complete a gradual cross-linking reaction of functional groups of the polyamic acid in the organic solvent. In this way, constituents of the polyamic acid are made into a three dimensional network structure and, as a result, a polyamic acid high molecular gel containing an organic solvent and the uncured curable resin component is obtained.

(4) A molded material is obtained by removing the solvent from the thus prepared polyamic acid high molecular gel containing the organic solvent and the uncured curable resin component.

(5) A polyamic acid composite containing a curable resin composition may be subjected to curing of the uncured curable resin component in the thus molded material.

The polyamic acid composite may contain other additives as the third component such as metal compounds, low molecular weight organic compounds, inorganic fillers, coloring agents, reinforced fibers and the like as the third component. They are incorporated into the composite preferably prior to completion of gelation. When the additive is incorporated as a solution it may also incorporated into the composite after completion of gelation.

The thus prepared polyamic acid composite is a high polymer gel which contains an organic solvent, usually in an amount of not exceeding 97% by weight. When the organic solvent is removed from the polyamic acid composite by drying, the aggregated molecular chains in the dried composite keep the same molecular structure as in the gel which includes solvent. The polyamic acid composite of the present invention, therefore, has a structure which can repeatly undergo swelling and shrinkage by the absorption and desorption of a solvent.

Drying of the polyamic acid composite gel, including vacuum drying, may preferably be performed at a temperature of not exceeding about 100° C. The drying temperature of higher than 100° C. alters the gel structure, because conversion of the polyamic acid into an imide form would gradually occur as the drying time lengthens.

The dried polyamic acid composite possesses unique properties because of its specific molecular structure in which at least a portion thereof exists as a three-dimensionally continued phase. The polyamic acid composite may be obtained in a state of, for example, fibers and films.

A film of the polyamic acid composite of the present invention may be obtained, for example, by the following process. First, a solution of the polyamic acid composite is cast on a flat support to complete formation of the three dimensional network molecular structure. In this way, a gel film of the polyamic acid composite having free-standing capability and containing an organic solvent in an amount of not exceeding about 97% by weight is obtained. Thereafter, the solvent is removed from the gel by heating it at a temperature of 100° C. or below and at an atmospheric pressure or under reduced pressure to obtain a solvent-free polyamic acid composite film.

The organic solvent in the gel film of the polyamic acid composite obtained as above may also be removed or washed out by immersion of the gel film in a coagulation bath of a poor solvent for the polyamic acid composite and exchanging the organic solvent by the poor solvent.

In this instance, water, alcohols such as methanol and ethanol and ketones such as acetone may be used as the coagulation solution alone or as a mixture of two or more thereof. A small portion of amide-based solvents such as N,N-dimethylacetamide and chlorine-based solvents such as 1,2-dichloroethane may be added to the coagulation solution. A solvent which harms the form of the polyamic acid composite by dissolving or swelling the composite should not be used as the coagulation solution.

The polyamic acid composite of the present invention is obtained by a novel method and has a novel interpenetrating polymer network structure which cannot be obtained from usually used polymer mixture systems without a step for the formation of a high polymer gel.

Because of the novel interpenetrating polymer network structure, the polyamic acid composite possesses unique properties and has both the characteristics of the polyamic acid and the high polymer component. With regard to the function of this composite, it has material separation abilities and stimulus-responding capacities, because it can repeatedly undergo swelling and shrinkage corresponding to the absorption and desorption of solvents and can change its conditions depending on external stimula such as temperature. Also, the polyamic acid composite is useful as a precursor of a polyimide composite which can provide a toughened molded material having an excellent heat resistance.

A polyimide composite in which molecular chains of the polyamic acid and the high polymer component or a curable resin composition interpenetrate can be produced from the polyamic acid described hereinabove.

A polyimide composite is obtained by imidization, that is, by dehydration and cyclization of the polyamic acid composite of the present invention. When the composite contains a curable composition, curing of the uncured resin composition can be carried out before, during or after imidization. The thus obtained polyimide composite has a unique interpenetrating polymer network molecular structure and also possesses unique properties.

The gel of the polyamic acid composite of the present invention contains preferably about 60 to 97% by weight of the organic solvent based on the total amount of the gel.

For the purpose of obtaining a polyimide composite in a state of a molded product such as a film, it is desirable to reduce the content of the solvent to about 0 to 50% by weight, preferably about 40% by weight or less, by removing the solvent at a temperature of about 100° C. or below and at atmospheric pressure or under reduced pressure, and then to perform dehydration and cyclization of the polyamic acid composite having such a reduced amount of solvent to complete its conversion into imide form.

Further, a polyimide film can be obtained in the following manner. The gel film of the polyamic acid which contains the solvent is immersed in a coagulating bath comprising a poor solvent for the polyamic acid, whereby the organic solvent left in the film is removed by the substitution of the solvent or the washing of the film is carried out. Thereafter, the film is peeled off from the support and treated at a high temperature or chemically treated to obtain a polyimide composite film. In this operation, water is generally used as a coagulating liquid. Alcohols such as methanol and ethanol may be used with water in an amount of not more than 50% by weight based on the total amount of the coagulating liquid. Further, ketones such as acetone, amide solvents such as N,N-dimethylacetamide and chlorine-containing solvents such as 1,2-dichloroethane may be used in an amount of not more than 20% by weight based on the total amount of the coagulating liquid.

Conversion of polyamic acid in the polyamic acid composite into the imide form may be effected by any usually used means for the production of polyimide resins. That is, a polyimide composite may be obtained by dehydration and cyclization of a polyamic acid component using high temperature or a chemical treatment.

In the case of a high temperature treatment, for example, a polyamic acid composite may be dried at a temperature of from about 50° to 200° C. for at least about 10 seconds to reduce the solvent to about 0 to 50% and then further heated at a high temperature of from about 150° to 500° C., preferably from about 200° to 450° C. for about 30 to 300 minutes until the imidization of the polyamic acid component is completely finished. A composite film having a high dimensional stability and excellent mechanical characteristics may be obtained when both ends of a film are fixed using a set of fixing frames, zippers, pin guides or the like prior to the heat treatment.

Dehydration and cyclization of polyamic acid may also be effected by chemical treatment, for example, by immersion of a polyamic acid composite in a solution of a dehydrating agent for penetrating the dehydrating agent in the composite.

Such chemical dehydration and cyclization may be completed effectively when an amine is used as a catalyst and an acid anhydride is used as a dehydrating agent. As the acid anhydride, aliphatic acid anhydrides such as acetic anhydride, propionic anhydride, butyric anhydride and the like and aromatic acid anhydrides such as benzoic anhydride may be used alone or as a mixture of two or more thereof.

The amines to be used as the catalyst may be at least one tertiary amine selected from the group consisting of trimethylamine, triethylamine, triethylenediamine, tributylamine, dimethylaniline, pyridine, $\alpha$-picoline, $\beta$-picoline, $\gamma$-picoline, isoquinoline, lutidine and the like.

The acid anhydride for use in the chemical dehydration reaction may be used in an amount of from 1 to 5 equivalents, preferably from 1 to 3 equivalents, per equivalent of carboxyl groups in the polyamic acid. The catalyst may be used in an amount of from 0.01 to 1.5 equivalents, preferably from 0.2 to 1 equivalent per equivalent of carboxyl groups in the polyamic acid.

In the polyamic acid composite gel of the present invention, a polyamic acid as its main component is considered to have a three dimensional network molecular structure which results principally from covalent bonding, and such a structure gives the composite a gel form which has free-standing capability at room temperature. Imidization of such a polyamic acid is completed by the aforementioned high temperature treatment or a chemical dehydration reaction, and the resulting polyimide composite acquires a molecular structure in which the polyimide is impregnated with a high polymer component to form an interpenetrating polymer network molecular structure (IPN structure). As a result, the thus obtained polyimide composite shows unique properties in having specific characteristics of the polyimide such as heat resistance and also those inherent to the high polymer component. By such a process, a composite film can be prepared which has a homogeneous polyimide/high polymer component composition and therefore has unique properties.

A composite film prepared by performing the imidization while maintaining the three dimensional network molecular structure (gel) of the polyamic acid appears to have a specific molecular structure at a microscopic level. As a consequence, a polyimide composite film having unique properties is obtained as a porous coagulation film when prepared by a mechanical treatment such as drawing or by solvent exchange in a coagulation bath.

A polyamic acid as the polyimide precursor is preferably prepared from the tetracarboxylic acid dianhydride, and the aromatic diamine shown below.

Pyromellitic acid dianhydride, benzophenonetetracarboxylic acid dianhydride and biphenyltetracarboxylic acid dianhydride may be used alone or as a mixture of two or more thereof as a preferred source of tetracarboxylic acid dianhydrides from the viewpoint of obtaining a polyimide composite having high heat resistance and excellent mechanical characteristics.

Metaphenylenediamine, paraphenylenediamine, diaminodiphenylmethane and diaminodiphenyl ether (e.g., 4,4'-diaminodiphenyl ether) may be used alone or as a mixture of two or more thereof as a preferred source of aromatic diamines from the viewpoint of obtaining a polyimide composite having high heat resistance and excellent mechanical characteristics.

The polyimide composite may be obtained in various shapes such as fibers and films.

The polyimide composite may contain other additives such as metal compounds, low molecular weight organic compounds, inorganic fillers, coloring agents, reinforced fibers and the like as described hereinbefore. These additives are usually incorporated in the polyimide composite prior to imidation of the polyamic acid.

The polyimide composite of the present invention is obtained by dehydration and cyclization of a precursor which has a novel interpenetrating polymer network molecular structure and is prepared by a novel means. Consequently, the polyimide composite has a novel interpenetrating polymer network structure which cannot be obtained from conventional polymer mixture systems and can be made into a toughened molded material or product having an excellent heat resistance.

In addition, the polyimide composite can be used as a functional high molecular material which can show material separation abilities and stimulus-responding capacities, by modifying the high polymer component in the composite by solvent or high temperature treatment.

Examples of the present invention are given below by way of illustration and not by way of limitation.

Chemical structures of compounds used in the Examples are shown at the end of the Examples.

EXAMPLE 1

A four neck distillation flask of 300 ml capacity was charged with 1.816 g of purified paraphenylenediamine (to be referred to as "PPD" hereinafter) and 0.633 g of 3,3',4,4'-tetraaminobiphenyl tetrahydrochloride dihydrate (to be referred to as "TABT" hereinafter). The flask was further charged with 50 g of distilled N,N-dimethylacetamide (to be referred to as "DMAc" hereinafter) and the above two compounds were dissolved in the distilled solvent by stirring.

The flask was then put on a water bath controlled at a temperature of 5° C. and charged with 4.366 g of purified absolute pyromellitic acid dianhydride (to be referred to as "PMDA" hereinafter) gradually (over 30 minutes) in a solid form with stirring under a nitrogen gas atmosphere, taking care to avoid any increase in the temperature of the solution. After completion of the addition of PMDA, stirring was continued for about 15 minutes to obtain a homogeneous polyamic acid solution.

Separately, 6.816 g of a commercial polyamideimide resin (Torlon 4000T, manufactured by Mitsubishi Chemical Industries Ltd.) was dissolved in 50 g of distilled DMAc in a 300 ml capacity beaker.

When the polyamideimide resin was completely dissolved, the resin solution was added to the above polyamic acid solution comprising PMDA, PPD and TABT, and the resulting mixture was stirred at 5° C. to obtain a homogeneously mixed solution of polyamic acid and polyamideimide resin.

The thus obtained mixed solution was cast on a glass plate. The layer of the solution was controlled using a spacer so as to a thickness of about 0.4 mm. When allowed to stand for a while, the mixed solution cast on the glass plate started to undergo gelation. Thus, a polyamic acid composite gel film was obtained.

The thus obtained polyamic acid composite gel film has a free-standing capability, because its shape did not change by its own weight.

The polyamic acid composite gel film was subjected to vacuum drying at 30° C. to evaporate the solvent in the gel film, and the resulting dry film was peeled from the glass plate. Infrared absorption spectrum analysis confirmed that this gel film was a mixture of a polyamic acid and a polyamideimide resin. Observation of the macroscopic structure of the film with a phase contrast microscope confirmed that the film had an interpenetrating polymer network molecular structure as shown in FIG. 1.

When the gel film was immersed in the DMAc solvent, it swelled but maintained its film shape without dissolving in the solvent.

COMPARATIVE EXAMPLE 1

A four neck distillation flask of 300 ml capacity was charged with 2.162 g of purified paraphenylenediamine. The flask was further charged with 50 g of distilled N,N-dimethylacetamide and the above compound was dissolved in the distilled solvent by stirring.

The flask was then put on a water bath controlled at a temperature of 5° C. and charged with 4.366 g of purified pyromellitic acid dianhydride in a solid form gradually with stirring under a nitrogen gas atmosphere, taking care to avoid any increase in the temperature of the solution. Thus, a homogeneous polyamic acid solution was obtained.

Separately, 6.528 g of a commercial polyamideimide resin (Torlon 4000T, manufactured by Mitsubishi Chemical Industries Ltd.) was dissolved in 50 g of distilled DMAc in a 300 ml capacity beaker.

When the polyamideimide resin was completely dissolved, the resin solution was added to the above polyamic acid solution to obtain a homogeneously mixed solution of polyamic acid and polyamideimide resin.

Figure 2:
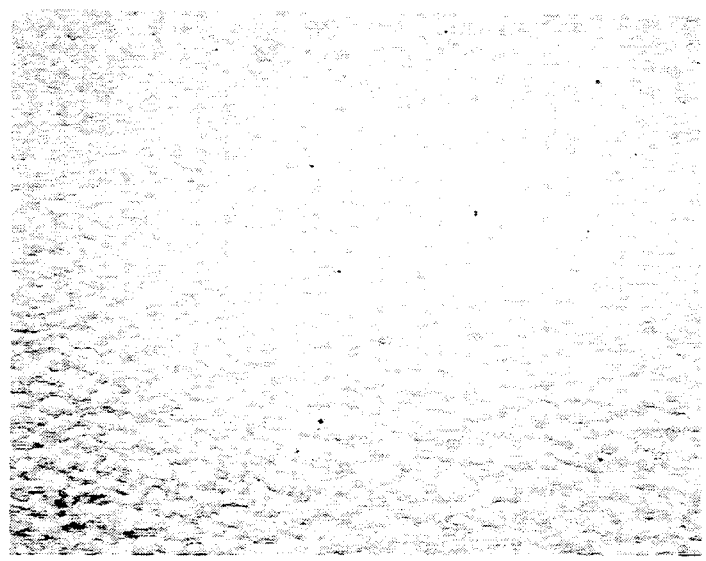
FIG. 2 is a photograph of a film of a polyamic acid composite prepared in Comparative Example 1 taken using a phase-contrast microscope at a magnification of 200.

The thus obtained mixed solution was cast on a glass plate in the same manner as in Example 1, but the solution did not undergo gelation and was still in a liquid state even after 5 hours of standing at room temperature. As shown in FIG. 2, macroscopic structure of a film prepared by removing the solvent from the mixed solution cast on the glass plate was completely different from that of the gel film obtained in Example 1.

EXAMPLE 2

A four neck distillation flask of 300 ml capacity was charged with 1.513 g of purified paraphenylenediamine, 0.721 g of 4,4'-diaminodiphenyl ether (to be referred to as "4,4'-DPE" hereinafter) and 0.475 g of 3,3',4,4'-tetraaminobiphenyl tetrahydrochloride dihydrate. The flask was further charged with 50 g of distilled N-methyl-2-pyrrolidone (to be referred to as "NMP" hereinafter) and the above three compounds were dissolved in the distilled solvent by stirring.

The flask was then put on a water bath controlled at a temperature of 5° C. and charged with 4.366 g of purified pyromellitic acid dianhydride in a solid form gradually with stirring under a nitrogen gas atmosphere, taking care to avoid any increase in the temperature of the solution.

Separately, 7.075 g of a commercial polyetherimide resin (ULTEM, manufactured by Japan G E Plastics Co., Ltd.) was dissolved in 50 g of distilled NMP in a 300 ml capacity beaker.

Thereafter, a mixed solution of polymers and a polyamic acid composite were prepared and their properties were evaluated in the same manner as in Example 1. A gel film having free-standing capability was obtained from this polyamic acid composite.

EXAMPLE 3

A four neck distillation flask of 300 ml capacity was charged with 2.480 g of purified 4,4'-diaminodiphenyl ether and 0.396 g of 3,3',4,4'-tetraaminobiphenyl tetrahydrochloride dihydrate. The flask was further charged with 40 g of distilled N,N-dimethylacetamide and the above two compounds were dissolved in the distilled solvent by stirring.

The flask was then put on a water bath controlled at a temperature of 5° C. and charged with 3.056 g of purified pyromellitic acid dianhydride in a solid form gradually with stirring under a nitrogen gas atmosphere, taking care to avoid any increase in the temperature of the solution.

Another four neck distillation flask of 300 ml capacity was charged with 1.168 g of purified 1,4-bis(4-aminophenoxy)benzene (to be referred to as "TPE-Q" hereinafter) and 0.396 g of 3,3',4,4'-tetraaminobiphenyl tetrahydrochloride dihydrate. The flask was further charged with 30 g of distilled N,N-dimethylformamide (to be referred to as "DMF" hereinafter) and the above two compounds were dissolved in the distilled solvent by stirring.

The flask was then put on a water bath controlled at a temperature of 5° C. and charged with 1.764 g of purified 3,3',4,4'-biphenyltetracarboxylic acid dianhydride (to be referred to as "BPDA" hereinafter) in a solid form gradually with stirring under a nitrogen gas atmosphere, taking care to avoid any increase in the temperature of the solution.

These two reaction solutions were mixed and stirred at 5° C. to obtain a homogeneous mixed solution.

Separately, 9.260 g of a commercial polyethersulfone resin (Victrex PES, manufactured by ICI) was dissolved in 70 g of distilled DMF in a 300 ml capacity beaker.

Thereafter, a mixed solution of polymers and then a polyamic acid composite were prepared therefrom and properties of the composite were evaluated in the same manner as in Example 1. A gel film having free-standing capability was obtained from this polyamic acid complex.

EXAMPLES 4 TO 11

Four neck distillation flasks of 300 ml capacity were charged with various kinds and amounts of monomers and solvents as shown in Table 1, mixed solutions of polymers and then polyamic acid composites were prepared in the same manner as in Example 1 or Comparative Example 1 and their properties were evaluated.

In every case of Examples 4 to 11, formation of polyamic acid composite gel was confirmed when each of the mixed solutions of polymers thus prepared was cast on a glass plate and allowed to stand for a while. Also, analyses of infrared absorption spectra confirmed that each of these polyamic acid composites was a composite of a polyamic acid and a high polymer component.

TABLE 1

| | Examples | | | | | | | | | | | C.E*1 |
|---|---|---|---|---|---|---|---|---|---|---|---|---|
| | 1 | 2 | 3 | 4 | 5 | 6 | 7 | 8 | 9 | 10 | 11 | 1 |
| Polyamic acid monomers/Amounts (g) | | | | | | | | | | | | |
| Acid anhydrides | | | | | | | | | | | | |
| PMDA | 4.366 | 4.366 | 3,056 | — | — | — | 2.183 | 2.183 | 4.366 | 4.366 | 4.366 | 4.366 |
| BTDA | — | — | — | 6.444 | — | — | 3.222 | — | — | — | — | — |
| DSTA | — | — | — | — | 7.160 | — | — | — | — | — | — | — |
| BPDA | — | — | 1.764 | — | — | 5.880 | — | 2.940 | — | — | — | — |
| Aromatic diamines | | | | | | | | | | | | |
| PPD | 1.816 | 1.513 | — | — | — | 1.816 | — | 1.816 | — | 1.513 | 2.162 | 2.162 |
| MPD | — | — | — | — | 0.324 | — | — | — | 0.865 | — | — | — |
| 4,4'-DPE | — | 0.721 | 2.480 | — | — | — | — | — | — | — | — | — |
| 3,3'-DDS | — | — | — | — | 2.483 | — | — | — | — | — | — | — |
| BAPP | — | — | — | 1.970 | — | — | — | — | — | — | — | — |
| BAPS | — | — | — | — | — | — | 4.289 | — | — | — | — | — |
| BAPB | — | — | — | 4.421 | — | — | — | — | — | — | — | — |
| TPE-R | — | — | — | — | — | — | 2.864 | — | — | — | — | — |
| TPE-Q | — | — | 1.168 | — | — | — | — | — | — | — | — | — |
| Polyamino compound | | | | | | | | | | | | |
| TAB | — | — | — | 0.171 | — | — | — | — | — | — | — | — |
| TABT | 0.634 | 0.475 | 0.792 | — | 1.188 | — | 0.238 | 0.634 | 2.376 | 0.634 | 0.792 | — |
| TADE | — | — | — | — | 0.230 | — | — | — | — | — | — | — |
| TADET | — | — | — | 0.301 | — | — | — | — | — | — | — | — |
| TRABT | — | — | — | — | — | 0.314 | — | — | — | — | — | — |
| Polymerization solvents*2 (g) | DMAc 50 | NMP 50 | DMF 30 DMAc 40 | DMAc 75 | DMSO 45 | NMP 40 | DMAc 70 | NMP 55 | DMAc 45 | DMAc 40 | DMAc 35 | DMAc 50 |

TABLE 1-continued

| | Examples | | | | | | | | | | | C.E*1 |
|---|---|---|---|---|---|---|---|---|---|---|---|---|
| | 1 | 2 | 3 | 4 | 5 | 6 | 7 | 8 | 9 | 10 | 11 | 1 |
| Polyamino compound molar ratio*3 | 8 | 6 | 10 | 8 | 20 | 8 | 3 | 8 | 30 | 8 | 10 | 0 |
| Acid value/amine value ratio | 1.00 | 1.00 | 0.98 | 1.00 | 0.95 | 1.04 | 0.95 | 1.00 | 1.00 | 1.16 | 0.83 | 1.00 |
| High polymer components (g) | | | | | | | | | | | | |
| | PAI | PEI | PES | PAa | PSu | PBI | PC | PBI | PAI | PAI | PAI | PAI |
| | 6.816 | 7.075 | 9.260 | 39.92 | 7.590 | 3.433 | 5.120 | 1.515 | 8.544 | 6.513 | 7.320 | 6.528 |
| | | | | | | | PI | PAa | | | | |
| | | | | | | | 25.12 | 6.058 | | | | |
| Solvents*2 | DMAc | NMP | DMF | NMP | DMF | DMAc | DMAc | NMP | DMAc | DMAc | DMAc | DMAc |
| (g) | 50 | 50 | 70 | 160 | 40 | 14 | 120 | 30 | 35 | 25 | 35 | 50 |
| Mixing ratio of high polymer components (wt %) | 50 | 50 | 50 | 75 | 40 | 30 | 70 | 50 | 50 | 50 | 50 | 50 |
| State of composite gels*4 | ◯ | ◯ | ◯ | ◯ | ◯ | ◯ | ◯ | ◯ | △ | △ | △ | X |

*1: Comparative Example
*2: DMAc, N,N-dimethylacetamide; NMP, N-methyl-2-pyrrolidone; DMF, N,N-dimethylformamide; DMSO, dimethylsulfoxide
*3: Mixing molar ratio of polyamino compound per 100 moles of acid anhydride
*4: ◯, Gel having free-standing capability; X, No gelling; △, Imperfect gel with no free-standing capability

| Name of the high polymer components shown in Table 1 and chemical structure | | | |
|---|---|---|---|
| Abbr. | Names | (trade name, manufacturer) | Glass Transition Temp. (°C.) |
| PES | Polyethersulfone | (Victrex PES, ICI) | 220–230 |
| PEI | polyetherimide | (ULTEM, Japan GE plastics Co., Ltd.) | 216 |
| PAI | polyamideimide | (Torlon, Mitsubishi Chemical Industries Ltd.) | 280 |
| PSu | polysulfone | (Udel P-1700, UCC) | 190 |
| PBI | polybenzimidazole | (PBI, Celanese Corp.) | 420 |
| PC | polycarbonate | (Idemitsu Polycarbonate Idemitsu Petrochemical Co., Ltd.) | 153–156 |
| PI | polyimide | (LARC-TPI, Mitsui Toatsu Chemicals, Inc.) | 260–270 |
| PAa | polyamic acid | (a prototype reaction product of PMDA with PPD, Toho Rayon Co., Ltd.) | 80–100 |

Thus, it is apparent that there has been provided, in accordance with the present invention, a high molecular polyamic acid composite having a toughened and multi-functional structure, in which molecular chains of a three dimensional network structure of a polyamic acid obtained from a tetracarboxylic acid dianhydride, an aromatic diamino compound and a polyamino compound are interpenetrated with molecular chains of other high polymer component.

EXAMPLE 12

A four neck distillation flask of 300 ml capacity was charged with 0.503 g of purified paraphenylenediamine (to be referred to as "PPD" hereinafter) and 0.176 g of 3,3',4,4'-tetraaminobiphenyl tetrahydrochloride dihydrate (to be referred to as "TABT" hereinafter). The flask was further charged with 20 g of distilled N-methylpyrrolidone (to be referred to as "NMP" hereinafter) and the above two compounds were dissolved in the distilled solvent by stirring.

The flask was then put on a water bath controlled at a temperature of 5° C. and charged with 1.210 g of purified absolute pyromellitic acid dianhydride (to be referred to as "PMDA" hereinafter) in a solid form gradually (over 30 minutes) with stirring under a nitrogen gas atmosphere, taking care to avoid increase in the temperature of the solution. After completion of the addition of PMDA, stirring was continued for about 15 minutes to obtain a homogeneous polyamic acid solution.

Separately from this, 5.667 g of a commercial polyethersulfone resin (Victrex PES, manufactured by I.C.I. Ltd.) was dissolved in 50 g of distilled NMP in a 300 ml capacity beaker.

When the polyethersulfone resin was dissolved completely, the resin solution was added to the above polyamic acid solution comprising PMDA, PPD and TABT, and the resulting mixture was stirred at 5° C. to obtain a homogeneously mixed solution of polyamic acid and polyethersulfone resin.

The thus obtained mixed solution was cast on a glass plate. The layer of the solution was controlled using a spacer to a thickness of about 0.4 mm. When stood still for a while, the mixed solution cast on the glass plate started to undergo gelation. In this way, a polyamic acid composite gel film was obtained.

The thus obtained polyamic acid composite gel film showed free-standing capability, because its shape did not change by its own weight.

When the gel film was immersed in the NMP solvent, it swelled but maintained its film shape without dissolving in the solvent.

The thus obtained gel film of the polyamic acid composite was subjected to vacuum drying at 30° C. to adjust the solvent content in the film to a level of 10% by weight based on the total weight and then peeled from the glass plate. After drying at 80° C. for 60 minutes and then at 120° C. for 60 minutes in an oven, the thus dried film was fixed on an iron frame and subjected to a continuous high temperature treatment at 150° C. for 1 hour, 200° C. for 1 hour, 300° C. for 1 hour and 350° C. for 1 hour in that order. In this manner, a homogeneous polyimide composite film having a light reddish brown color with a thickness of about 30 μm was obtained.

By measuring infrared absorption spectra of the thus obtained polyimide composite film, absorption peaks specific to the imido group (1780 cm$^{-1}$ and 1720 cm$^{-1}$)

were observed, thus confirming the presence of imido groups in the film.

With regard to the properties of this film, temperature required to decrease 5% by weight of the film was measured by thermogravimetric analysis, glass transition temperature was measured by thermomechanical analysis (TMA) and tensile strength was measured by a material testing machine. For the measurement of tensile strength, a strip of test piece with 5 mm in width was cut out of the polyimide film and subjected to the testing machine (distance between chucks, 30 mm; tensile rate, 5 mm/minutes). All measurements were performed at 23° C.

As shown in Table 2, this film showed excellent heat resistance and mechanical characteristics.

Figure 3:
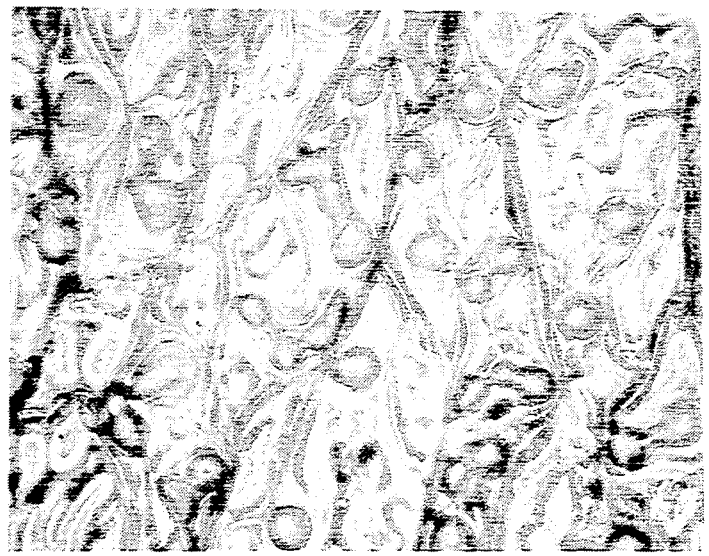
FIG. 3 is a photograph of a film of a polyimide composite (interpenetrating polymer network molecular structure) prepared in Example 12 of the present specification, taken using a phase contrast microscope at a magnification of 200.

Observation of macroscopic structure of the film under a phase contrast microscope confirmed that this film was possessed of an interpenetrating polymer network molecular structure with a complex phase separation pattern as shown in FIG. 3.

COMPARATIVE EXAMPLE 2

A four neck distillation flask of 300 ml capacity was charged with 0.599 g of purified paraphenylenediamine. The flask was further charged with 20 g of distilled N-methyl-N-pyrrolidone (NMP) and the above compound was dissolved in the distilled solvent by stirring.

The flask was then put on a water bath controlled at a temperature of 5° C. and charged with 1.210 g of purified pyromellitic acid dianhydride in a solid form with gradually stirring under a nitrogen gas atmosphere, taking care to avoid increase in the temperature of the solution. In this way, a homogeneous polyamic acid solution was obtained.

Separately from this, 5.427 g of a commercial polyethersulfone resin (Victrex PES, manufactured by ICI Ltd.) was dissolved in 50 g of distilled NMP in a 300 ml capacity beaker.

When the polyethersuflone resin was dissolved completely, the resin solution was added to the above polyamic acid solution to obtain a homogeneously mixed solution of polyamic acid and polyethersulfone resin.

The thus obtained mixed solution was cast on a glass plate in the same manner as in Example 12, but the solution did not undergo gelation and was still in a liquid state even after 5 hours of standing at room temperature.

A polyamic acid composite film was prepared by removing the solvent from the mixed solution cast on the glass plate. When the film was immersed in NMP solvent, it dissolved in the solvent.

Figure 4:
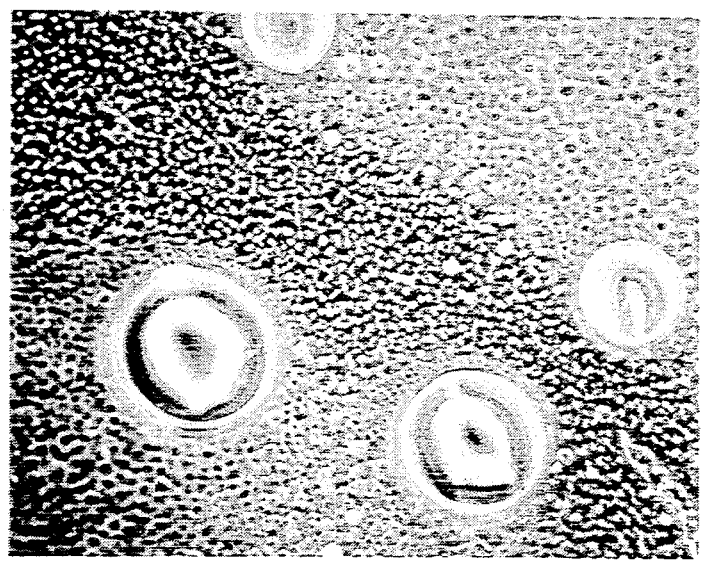
FIG. 4 is a photograph of a film of a polyimide acid composite prepared in Comparative Example 2 taken using a phase contrast microscope at a magnification of 200.

The thus prepared polyamic acid composite film was treated in the same manner as in Example 12 to obtain a polyimide composite film. When properties of the thus obtained composite film were evaluated in the same manner as in Example 12, its thermal characteristics were inferior to those of the film obtained in Example 12 as shown in Table 2. As shown in FIG. 4, macroscopic structure of the film was completely different from that of the film obtained in Example 12.

EXAMPLE 13

A four neck distillation flask of 300 ml capacity was charged with 1.513 g of purified paraphenylenediamine, 0.721 g of 4,4'-diaminodiphenyl ether (to be referred to as "4,4'-DPE" hereinafter) and 0.475 g of 3,3',4,4'-tetraaminobiphenyl tetrahydrochloride dihydrate. The flask was further charged with 50 g of distilled N-dimethylacetamide (to be referred to as "DMAc" hereinafter) and the above three compounds were dissolved in the distilled solvent by stirring.

The flask was then put on a water bath controlled at a temperature of 5° C. and charged with 4.366 g of purified pyromellitic acid dianhydride in a solid form gradually with stirring under a nitrogen gas atmosphere, taking care to avoid increase in the temperature of the solution.

Separately, 7.075 g of a commercial polyetherimide resin (ULTEM, manufactured by Japan G E Plastics Co., Ltd.) was dissolved in 50 g of distilled DMAc in a 300 ml capacity beaker.

When the polyetherimide resin was completely dissolved in the solvent, the resulting solution was added to the aforementioned polyamic acid solution to obtain a homogeneously mixed solution of the polyamic acid and polyetherimide resin.

Thereafter, a polyimide composite was prepared and its properties were evaluated in the same manner as in Inventive Example 12, with the results shown in Table 2.

EXAMPLE 14

A four neck distillation flask of 300 ml capacity was charged with 2.480 g of purified 4,4'-diaminodiphenyl ether and 0.396 g of 3,3',4,4'-tetraaminobiphenyl tetrahydrochloride dihydrate. The flask was further charged with 40 g of distilled N,N-dimethylacetamide and the above two compounds were dissolved in the distilled solvent by stirring.

The flask was then put on a water bath controlled at a temperature of 5° C. and charged with 3.056 g of purified pyromellitic acid dianhydride in a solid form gradually with stirring under a nitrogen gas atmosphere, taking care to avoid increase in the temperature of the solution.

Another four neck distillation flask of 300 ml capacity was charged with 1.168 g of purified 1,4-bis(4-aminophenoxy)benzene (to be referred to as "TPE-Q" hereinafter) and 0.396 g of 3,3',4,4'-tetraaminobiphenyl tetrahydrochloride dihydrate. The flask was further charged with 30 g of distilled N,N-dimethylformamide (to be referred to as "DMF" hereinafter) and the above two compounds were dissolved in the distilled solvent by stirring.

The flask was then put on a water bath controlled at a temperature of 5° C. and charged with 1.764 g of purified 3,3',4,4'-biphenyltetracarboxylic acid dianhydride (to be referred to as "BPDA" hereinafter) in a solid form gradually with stirring under a nitrogen gas atmosphere, taking care to avoid increase in the temperature of the solution.

These two reaction solutions were mixed and stirred at 5° C. to obtain a homogeneous mixed solution.

Separately, 9.260 g of a commercial polyamideimide resin. (Torlon 4000T, manufactured by Mitsubishi Chemical Industries Ltd.) was dissolved in 70 g of distilled DMF in a 300 ml capacity beaker.

When the polyamideimide resin was completely dissolved in the solvent, the resulting solution was added to the aforementioned polyamic acid solution to obtain a homogeneously mixed solution of the polyamic acid and polyamideimide resin.

Thereafter, a polyimide composite was prepared and its properties were evaluated in the same manner as in Example 12, with the results shown in Table 2.

EXAMPLES 15 TO 20

A four neck distillation flasks of 300 ml capacity were charged with various kinds and amounts of monomers and solvents as shown in Table 2, and polyimide composites were prepared in the same manner as in Example 12 or Comparative Example 2 and their properties were evaluated.

In every case of Examples 15 to 20, formation of polyamic acid composite gel was confirmed when each of the mixed solutions of polymers thus prepared (polymer concentration, 10 to 20% by weight) was cast on a glass plate and stood still for a while.

As shown in Table 2, every high temperature treated polyimide composite film obtained in the Inventive Examples showed relatively homogeneous structure and markedly high mechanical properties. In this instance, film properties were evaluated using films having 20 to 50 μm in thickness.

TABLE 2-1

|  | Examples | | | | | | | | | C.E.[*1] |
|---|---|---|---|---|---|---|---|---|---|---|
|  | 12 | 13 | 14 | 15 | 16 | 17 | 18 | 19 | 20 | 2 |
| Polyamic acid monomers/Amounts (g) | | | | | | | | | | |
| Acid anhydrides | | | | | | | | | | |
| PMDA | 1.210 | 4.366 | 3,058 | — | — | — | 2.183 | 2.183 | 4.366 | 1.210 |
| BTDA | — | — | — | 6.444 | — | — | 3.222 | — | — | — |
| DSTA | — | — | — | — | 7.160 | — | — | — | — | — |
| BPDA | — | — | 1.764 | — | — | 5.880 | — | 2.940 | — | — |
| Aromatic diamines | | | | | | | | | | |
| PPD | 0.503 | 1.513 | — | — | — | 1.513 | — | 1.816 | 0.865 | 0.599 |
| MPD | — | — | — | — | 1.081 | — | — | — | — | — |
| 4,4'-DPE | — | 0.721 | 2.480 | — | — | — | — | — | — | — |
| 3,3'-DDS | — | — | — | — | 0.745 | — | — | — | — | — |
| BAPP | — | — | — | 1.970 | — | — | — | — | — | — |
| BAPS | — | — | — | — | — | — | 4.289 | — | — | — |
| BAPB | — | — | — | 4.421 | — | — | — | — | — | — |
| TPE-R | — | — | — | — | — | — | 2.864 | — | — | — |
| TPE-Q | — | — | 1.168 | — | — | 0.818 | — | — | — | — |
| Polyamino compound | | | | | | | | | | |
| TAB | — | — | — | 0.171 | — | — | — | — | — | — |
| TABT | 0.176 | 0.475 | 0.782 | — | 1.188 | — | 0.238 | 0.634 | 2.376 | — |
| TADE | — | — | — | — | 0.230 | — | — | — | — | — |
| TADET | — | — | — | 0.301 | — | — | — | — | — | — |
| TRABT | — | — | — | — | — | 0.314 | — | — | — | — |
| Polymerization solvents[*2] (g) | NMP 20 | DMAc 50 | DMF 30 DMAc 40 | DMAc 75 | DMSO 60 | NMP 50 | DMAc 70 | NMP 40 | DMF 40 | NMP 20 |
| Polyamino compound molar ratio[*3] | 8 | 6 | 10 | 8 | 20 | 8 | 3 | 8 | 30 | 0 |
| Acid value/amine value ratio | 1.00 | 1.00 | 0.98 | 1.00 | 0.95 | 1.04 | 0.95 | 1.00 | 1.00 | 1.00 |
| High polymer components (g) | | | | | | | | | | |
|  | PES | PEI | PAI | PAa | PSu | PBI | PC | PBI | PAI | PES |
|  | 5.667 | 7.075 | 9.280 | 13.30 | 34.16 | 3.433 | 5.120 PI 25.12 | 1.151 PAa 6.058 | 8.544 | 5.427 |
| Solvents[*2] (g) | NMP 50 | DMAc 50 | DMF 70 | NMP 75 | DMF 140 | DMAc 15 | DMAc 120 | NMP 45 | DMF 35 | NMP 50 |
| Mixing ratio of high polymer components (wt %) | 75 | 50 | 50 | 50 | 75 | 30 | 70 | 50 | 50 | 75 |

[*1]: Comparative Example
[*2]: DMAc, N,N-dimethylacetamide; NMP, N-methyl-2-pyrrolidone; DMF, N,N-dimethylformamide; DMSO, dimethylsulfoxide
[*3]: Mixing molar ratio of polyamino compound per 100 moles of acid anhydride

TABLE 2-2

| Item | Examples | | | | | | | | | C.E.[*1] |
|---|---|---|---|---|---|---|---|---|---|---|
|  | 12 | 13 | 14 | 15 | 16 | 17 | 18 | 19 | 20 | 2 |
| Conditions of polyamic acid composite gels[*2] | ○ | ○ | ○ | ○ | ○ | ○ | ○ | ○ | △ | X |
| Temperature at final imidization (°C.) | 350 | 350 | 350 | 400 | 350 | 400 | 350 | 400 | 350 | 350 |
| Properties of polyimide composites | | | | | | | | | | |
| Film property[*3] | ○ | ○ | ○ | ○ | ○ | ○ | ○ | ○ | △ | X |
| 5% weight loss temperature (°C.)[*4] | 520 | 520 | 530 | 560 | 510 | >600 | 530 | >600 | 510 | 510 |
| Glass transition temperature (°C.)[*5] | 280 | 290 | 340 | 350 | 220 | >400 | 300 | >400 | 230 | 230 |
| Tensile strength (Kgf/mm$^2$) | 10 | 10 | 12 | 10 | 8 | 15 | 17 | 12 | 4 | 2 |
| Elastic modulus (Kgf/mm$^2$) | 320 | 350 | 450 | 550 | 290 | 650 | 380 | 680 | 300 | 220 |

TABLE 2-2-continued

| Item | Examples | | | | | | | | | C.E.*1 |
|---|---|---|---|---|---|---|---|---|---|---|
| | 12 | 13 | 14 | 15 | 16 | 17 | 18 | 19 | 20 | 2 |
| Folding Properties*6 | ◯ | ◯ | ◯ | ◯ | ◯ | △ | ◯ | ◯ | △ | ◯ |

*1: Comparative Example
*2: Gel condition: ◯, gel having free-standing capability; X, no gelling; △, imperfect gel with no free-standing capability
*3: Film properties: ◯, tough; △, slightly brittle; X, brittle
*4: 5% weight loss temperature was evaluated by thermogravimetric analysis (nitrogen atmosphere); temperature increasing rate, 10° C./min
*5: Glass transition temperature was evaluated by thermogravimetric analysis (temperature increasing rate, 10° C./min; loading, 10 g)
*6: Folding properties: state of the film after folding the film into two and returning; ◯, film had a wrinkle at the folded portion; △, film was extremely susceptible to be cut (film was partially cut or film barely kept the wrinkled state at the folded portion); X, film was cut at the folded portion

EXAMPLE 21

A polyamic acid solution was prepared in the same manner as Example 1 except that the monomer components were charged as shown in Table 3-1.

Separately from this, 1.096 g of a commercial epoxy resin (Araldite MY720, manufactured by Ciba-Geigy Ltd.), 0.470 g of another commercial epoxy resin (Epikote 1001, manufactured by Shell Chemicals Co., Ltd.) and 0.657 g of a curing agent (4,4'-diaminodiphenyl sulfone) were dissolved in 10 g of distilled NMP in a 100 ml capacity beaker. When the thus prepared epoxy resin composition was dissolved completely, the resin solution was added to the above polyamic acid solution and the resulting mixture was stirred to obtain a uniformly mixed solution of the polyamic acid and the epoxy resin composition.

The thus obtained mixed solution was cast on a glass plate. The layer of the solution was controlled using a spacer to a thickness of about 0.4 mm. When stood still for a while, the mixed solution cast on the glass plate started to undergo gelation. In this way, a gel film of a composite of the polyamic acid and the epoxy resin (uncured monomer components) was obtained.

The thus obtained polyamic acid composite gel film showed free-standing capability.

The polyamic acid composite gel film was subjected to vacuum drying at 30° C. to adjust the content of the solvent in the gel film to 5% by weight based on the whole gel weight, and the resulting dry film was peeled from the glass plate. The thus partially dried gel film was further dried in an oven at 80° C. for 60 minutes and then at 120° C. for 60 minutes. After fixing on an iron flame, the film was subjected to a continuous high temperature treatment at 150° C. for 1 hour, 200° C. for 1 hour and 300° C. for 1 hour in that order, to complete dehydration and cyclization of the polyamic acid components and curing of the epoxy resin composition. In this way, a uniform polyimide composite film showing a light reddish brown color and having a thickness of about 30 μm was obtained.

By measuring infrared absorption spectra of the thus obtained polyimide composite film, absorption peaks specific to the imido group (1780 cm$^{-1}$ and 1720 cm$^{-1}$) were observed, thus confirming the presence of imide groups in the film.

The properties of the composite were measured in the same manner as Example 12 and the thus obtained results are shown in Table 3-2.

Figure 5:
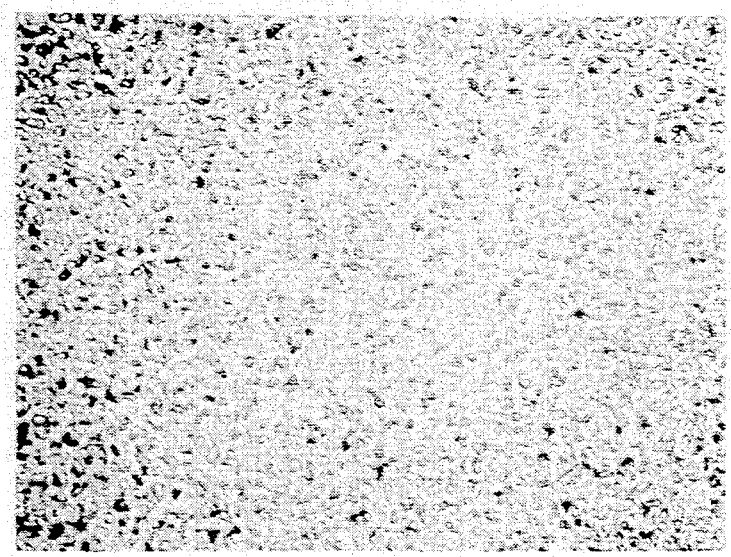
FIG. 5 is a photograph of a film of a polyimide composite (interpenetrating polymer network molecular structure prepared in Example 21 of the present specification, taken using a phase contrast microscope at a magnification of 200.

As shown in Table 3-2, this film had an excellent heat resistance and good mechanical properties. Observation of macroscopic structure of the film under a phase contrast microscope confirmed that the film had an interpenetrating polymer network structure as shown in FIG. 5.

COMPARATIVE EXAMPLE 3

Polyamino compounds were not used in this comparative example.

A four neck distillation flask of 300 ml capacity was charged with 0.599 g of purified paraphenylenediamine (PPD). The flask was further charged with 20 g of distilled N-methyl-2-pyrrolidone (to be referred to as "NMP" hereinafter) and the above compound was dissolved in the distilled solvent with mixing.

The flask was then put on a water bath controlled at a temperature of 5° C. and charged with 1.786 g of purified 3,3',4,4'-benzophenonetetracarboxylic acid dianhydride (BTDA) in a solid form gradually with stirring under a nitrogen gas atmosphere, taking care to avoid increase in the temperature of the solution. In this way, a polyamic acid solution was obtained.

Separately from this, 1.176 g of a commercial epoxy resin (Araldite MY720, manufactured by Ciba-Geigy Ltd.), 0.504 g of another commercial epoxy resin (Epikote 1001, manufactured by Shell Chemicals Co., Ltd.) and 0.705 g of a curing agent (4,4'-diaminodiphenyl sulfone) were dissolved in 10 g of distilled NMP in a 100 ml capacity beaker. When the thus prepared epoxy resin composition was dissolved completely, the resin solution was added to the above polyamic acid solution comprising BTDA and PPD and the resulting mixture was stirred to obtain a uniformly mixed solution of the polyamic acid and the epoxy resin composition.

The thus obtained mixed solution was cast on a glass plate in the same manner as in Example 21, but the solution did not start gelation and was still in a fluid state even after 5 hours of standing at room temperature. When a film was prepared by removing the solvent from the polyamic acid solution cast on the glass plate and the thus prepared film was immersed in the NMP solvent, it dissolved in the solvent.

Figure 6:
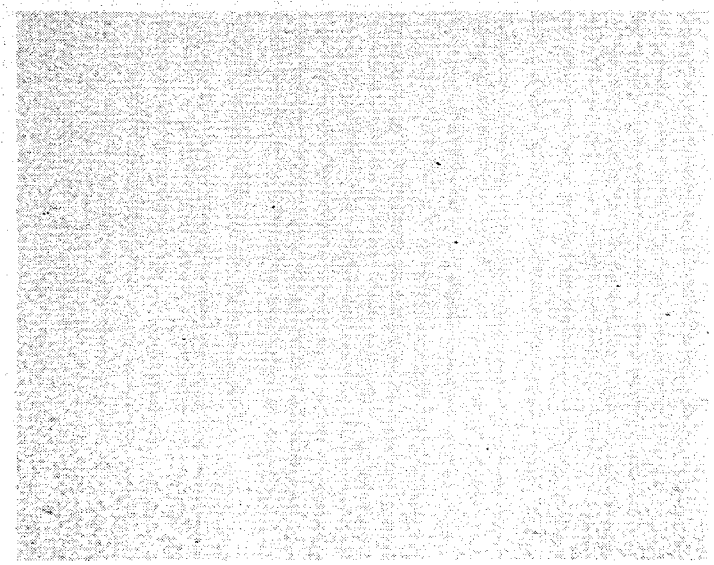
FIG. 6 is a photograph of a film of a polyimide composite prepared in Comparative Example 3 taken using a phase contrast microscope at a magnification of 200.

The thus obtained polyamic acid composite gel film was treated in the same manner as in Example 21 to prepare a polyimide composite film. Properties of the resulting film were evaluated in the same manner as in Example 21, with the results shown in Table 3-2. As is evident from the table, thermal properties of this film were inferior to those of the film obtained in Example 21. As shown in FIG. 6, macroscopic structure of this film observed under a phase contrast microscope was different from that of the film of Example 21.

EXAMPLE 22

A polyamic acid solution was prepared in the same manner as in Example 2.

Separately, 4.955 g of a commercial bismaleimide resin (BT Resin BT-2160-, manufactured by Mitsubishi Gas Chemical Company, Inc.) and 2.120 g of a commercial epoxy resin (Epikote 1001, manufactured by Shell Chemicals Co., Ltd.) were dissolved in 20 g of distilled DMF solvent in a 300 ml capacity beaker. When the bismaleimide and epoxy resins were dissolved completely, the resulting solution was added to the above polyamic acid solution to obtain a uniform mixed solution of the polyamic acid, the bismaleimide resin and the epoxy resin.

Thereafter, a polyimide composite was prepared and its properties were evaluated in the same manner as in Inventive Example 21, with the results shown in Table 3-2.

EXAMPLE 23

A polyamic acid solution was prepared in the same manner as in Example 3.

Separately from these, 5.93 g of a commercial vinyl ester resin (Lipoxy SP-1506, manufactured by Showa Highpolymer Co., Ltd.), 0.12 g of benzophenone and 0.12 g of dimethylaminoethanol were dissolved in 30 g of distilled DMF in a 300 ml capacity beaker.

When the vinyl ester resins were dissolved completely, the resulting solution was added to the above polyamic acid solution to obtain a uniform mixed solution of the polyamic acid and the vinyl ester resin. A polyamic acid/vinyl ester resin complex gel film was prepared from the thus obtained mixed solution in the same manner as in Example 21. By removing the solvent from the composite gel film, a uniform polyamic acid composite film was obtained. The thus obtained composite film was exposed to light for 10 seconds using a high pressure mercury lamp (output, 80 W/cm) at a distance of 15 cm from the film, in order to cure the vinyl ester resin.

Thereafter, the thus cured composite film was subjected to a high temperature treatment in the same manner as in Example 21 to complete imidization of the polyamic acid components. Properties of this film were evaluated in the same manner as in Example 21, with the results shown in Table 3-2.

EXAMPLES 24 TO 27

A four neck distillation flasks of 300 ml capacity were charged with various kinds and amounts of monomers and solvents as shown in Table 3-1, and a composite of polyimides and curable resin were prepared in the same manner as in Example 21 and their properties were evaluated.

In every case of Examples 24 to 27, formation of polyamic acid composite gel was confirmed when each of the mixed solutions of polymers thus prepared (polymer concentration, 10 to 20% by weight) was cast on a glass plate and stood still for a while.

As shown in Table 3-2, every high temperature treated polyimide composite film obtained in the Inventive Examples showed relatively homogeneous structure and markedly high mechanical properties. In this instance, film properties were evaluated using films having 20 to 50 μm in thickness.

TABLE 3-1

| | Examples | | | | | | | C.E*[1] |
|---|---|---|---|---|---|---|---|---|
| | 21 | 22 | 23 | 24 | 25 | 26 | 27 | 3 |
| Polyamic acid monomers/Amounts (g) | | | | | | | | |
| Acid anhydrides | | | | | | | | |
| PMDA | — | 4.366 | 3.056 | 4.366 | — | 2.183 | 4.366 | — |
| BTDA | 1.611 | — | — | — | — | — | — | 1.786 |
| DSTA | — | — | 2.148 | — | — | — | — | — |
| BPDA | — | — | — | — | 5.880 | 2.940 | — | — |
| Aromatic diamines | | | | | | | | |
| PPD | 0.454 | 1.513 | — | — | — | 1.513 | 1.081 | 0.599 |
| MPD | — | — | — | — | 1.081 | — | — | — |
| 4,4'-DPE | — | 0.721 | 2.480 | 2.403 | — | — | — | — |
| 3,3'-DDS | — | — | — | — | 0.745 | — | — | — |
| BAPP | — | — | — | — | — | — | 0.657 | — |
| BAPS | — | — | — | — | — | — | — | — |
| BAPB | — | — | — | 1.768 | — | — | — | — |
| TPE-R | — | — | — | — | — | — | — | — |
| TPE-Q | — | — | 1.168 | — | — | 0.818 | — | — |
| Polyamino compound | | | | | | | | |
| TAB | — | — | — | 0.171 | — | — | — | — |
| TABT | 0.158 | 0.475 | 0.792 | — | 1.188 | — | 1.980 | — |
| TADE | — | — | — | — | 0.230 | — | — | — |
| TADET | — | — | — | 0.301 | — | — | — | — |
| TRABT | — | — | — | — | — | 0.314 | — | — |
| Polymerization solvents*[2] (g) | NMP 20 | DMP 50 | DMF 30 DMAc 40 | DMAc 60 | DMSO 55 | NMP 50 | DMF 50 | NMP 20 |
| Curable resin composition shown in Table 3-3 (g) | (1) 2.223 | (2) 7.075 | (3) 6.170 | (4) 9.009 | (5) 13.69 | (6) 3.329 | (7) 18.86 | (1) 2.385 |
| Solvents (g)*[2] | NMP 10 | DMF 20 | DMF 30 | NMP 25 | DMF 35 | DMAc 8 | DMF 30 | NMP 10 |
| Polyamino compound molar ratio*[3] | 8 | 6 | 10 | 8 | 20 | 8 | 25 | 0 |
| Mixing ratio of curable resin composition (wt %) | 50 | 50 | 40 | 50 | 60 | 30 | 70 | 50 |
| Acid value/amine value ratio | 1.00 | 1.00 | 0.98 | 1.00 | 0.95 | 1.04 | 0.93 | 1.00 |

*[1]: Comparative Example
*[2]: DMAc, N,N-dimethylacetamide; NMP, N-methyl-2-pyrrolidone; DMF, N,N-dimethylformamide; DMSO, dimethylsulfoxide
*[3]: Mixing molar ratio of polyamino compound per 100 moles of acid anhydride

TABLE 3-2

| Items | \multicolumn{7}{c}{Examples} | C.E*[1] |
|---|---|---|---|---|---|---|---|---|
| | 21 | 22 | 23 | 24 | 25 | 26 | 27 | 3 |
| Conditions of polyamic acid composite gels*[2] | ◯ | ◯ | ◯ | ◯ | ◯ | ◯ | ◯ | X |
| Temperature at final imidation (°C.) | 300 | 300 | 300 | 300 | 300 | 350 | 300 | 300 |
| Properties of polyimide composites*[3] | | | | | | | | |
| Film formability | ◯ | ◯ | ◯ | ◯ | ◯ | ◯ | ◯ | ◯ |
| 5% weight loss temperature (°C.) | 430 | 420 | 410 | 490 | 430 | 480 | 410 | 400 |
| Glass transition temperature (°C.) | 360 | 360 | 320 | 320 | 300 | 370 | 300 | 340 |
| Tensile strength (kgf/mm$^2$) | 4 | 5 | 6 | 2 | 2 | 8 | 4 | 1 |
| Elastic modulus (kgf/mm$^2$) | 435 | 350 | 410 | 380 | 350 | 380 | 360 | 351 |

*[1]: Comparative Example
*[2]: Gel conditions: ◯, gel having free-standing capability; X, no gelling
*[3]: Film formability: ◯, film can be formed; X, film can not be formed
5% weight loss temperature was evaluated by thermogravimetric analysis (nitrogen atmosphere; temperature increasing rate, 10° C./min)
Glass transition temperature was evaluated by thermomechanical analysis (temperature increasing rate, 10° C./min; loading, 10 g)

TABLE 3-3

(Curable resin composition)

| Resins | Particulars of resins used (manufacturer) | Mixing ratio (weight parts) | Tg of cured product*[1] (°C.) | Curing temperature (°C.) |
|---|---|---|---|---|
| Epoxy resin (1) | MY 720 (Ciba-Geigy) | 70 | 220 | 180 |
| | Epikote 1001 (Shell Chemicals) | 30 | | |
| | 4,4'-diaminophenyl sulfone | 42 | | |
| Bismaleimide resin (2) | BT-2160 (Mitsubishi Gas Chemical) | 70 | 220 | 180 |
| | Epikote 1001 (Shell Chemicals) | 30 | | |
| Vinyl ester resin (3) | Lipoxy SP-1506 (Showa Highpolymer) | 100 | not clear | (photo-curing) |
| | benzophenone | 2 | | |
| | dimethylaminoethanol | 2 | | |
| Phenol resin (4) | PR-9480 (Sumitomo Dules) | 100 | 200 | 180 |
| COPNA*[2] (5) | SK Resin (Sumitomo Kinzoku Kako) | 100 | not clear | 200 |
| Polystyrylpyridine resin (6) | PSP 6022PL (Dainippon Ink) | 90 | 300 | 200 |
| | MP-2000 (Mitsubishi Petrochemical) | 10 | | |
| Bismaleimide resin (7) | Compimide 796 (Shell Chemicals) | 80 | 250 | 200 |
| | TM 123 (Shell Chemicals) | 10 | | |
| | Polyether Sulfone (ICI) | 10 | | |

*[1]: The Tg value of cured product was measured in accordance with DSC (temperature increase at a rate of 10° C./min. under N$_2$ atmosphere)
*[2]: Condensed polynuclear aromatic resin

COMPARATIVE EXAMPLES 4 TO 7

The same procedure as Examples 13, 14, 16, and 18 was conducted as Comparative Examples 4 to 7, except that a tri- or tetra-amino compound was not used for the production of the polyamic acid compound in each Comparative Example. In these Comparative Examples, polymers having a linear molecular structure were obtained.

The components used in each Comparative Example and the amounts thereof are shown in Table 4-1 and the test results of each composite are shown in Table 4-2.

TABLE 4-1

| Comparative Example | 4 | 5 | 6 | 7 |
|---|---|---|---|---|
| (Corresponding Example) | (13) | (14) | (16) | (18) |
| Polyamic acid monomers/Amounts (g) | | | | |
| Acid anhydrides | | | | |
| PMDA | 4.366 | 3.058 | — | 2.183 |
| BTDA | — | — | — | 3.222 |
| DSTA | — | — | 7.160 | — |
| BPDA | — | 1.764 | — | — |
| Aromatic diamines | | | | |
| PPD | 1.643 | — | — | — |
| MPD | — | — | 1.513 | — |
| 4,4'-DPE | 0.961 | 2.883 | — | — |
| 3,3'-DDS | — | — | 1.736 | — |
| BAPP | — | — | — | — |
| BAPS | — | — | — | 4.579 |
| BAPB | — | — | — | — |
| TPE-R | — | — | — | 3.037 |
| TPE-Q | — | 1.752 | — | — |
| Polyamino compound | | | | |
| TAB | — | — | — | — |
| TABT | — | — | — | — |
| TADE | — | — | — | — |
| TADET | — | — | — | — |
| TRABT | — | — | — | — |
| Polymerization solvents*[1] (g) | DMAc 50 | DMF 30 DMAc 40 | DMSO 60 | DMAc 70 |
| High polymer Components (g) | PEI 6.970 | PAI 9.455 | PSu 31.23 | PC 5.16 PI 25.22 |
| Solvents*[1] | DMAc 50 | DMF 70 | DMF 140 | DMAc 120 |
| Polyamino compound*[2] molar ratio | 0 | 0 | 0 | 0 |
| Mixing ratio of high polymer components (wt %) | 50 | 50 | 75 | 70 |
| Acid value/amine value ratio | 1.00 | 0.98 | 0.95 | 0.95 |

*[1]: DMAc, N,N-dimethylacetamide; DMSO, dimethyl sulfoxode; DMF, N,N-dimethylformamide
*[2]: Mixing molar ratio of polyamino compound per 100 moles of acid anhydride

TABLE 4-2

| Comparative Example<br>(Corresponding Example) | 4<br>(13) | 5<br>(14) | 6<br>(16) | 7<br>(18) |
|---|---|---|---|---|
| Conditions of polyamic acid composite gels*2 | X | X | X | X |
| Temperature at final imidization (°C.) | 350 | 350 | 350 | 350 |
| Properties of polyimide composites | | | | |
| Film property*3 | X | X | X | ○ |
| 5% weight loss temperature (°C.)*4 | 520 | 530 | 500 | 520 |
| Glass transition temperature (°C.)*5 | 215 | 250 | 190 | 250 |
| Tensile strength (Kgf/mm²) | 6 | 7 | 4 | 15 |
| Elastic modulus (Kgf/mm²) | 280 | 350 | 250 | 350 |
| Folding Properties*6 | X | X | X | Δ |

*2: Gel condition: ○, gel having free-standing capability; X, no gelling; Δ, imperfect gel with no free-standing capability
*3: Film properties: ○, tough; Δ, slightly brittle; X, brittle
*4: 5% weight loss temperature was evaluated by thermogravimetric analysis (nitrogen atmosphere); temperature increasing rate, 10° C./min
*5: Glass transition temperature was evaluated by thermogravimetric analysis (temperature increasing rate, 10° C./min; loading, 10 g)
*6: Folding properties: state of the film after folding the film into two and returning; ○, film had a wrinkle at the folded portion; Δ, film was extremely susceptible to be cut (film was partially cut or film barely kept the wrinkled state at the folded portion); X, film was cut at the folded portion By comparing the results of Examples 12, 13, 14, 16 and 18 with those of Comparative Examples 2, 4, 5, 6 and 7, respectively, it is clear that when a polyamic acid composite (such as that in Example 12, 13, 14, 15, 16 or 18) is prepared by using a tri- or tetra-amino compound to obtain a polymer having a three-dimensional network molecular structure, a composite having higher heat resistance and higher mechanical strength than those of the corresponding comparative composite (such as in Comparative Example 2, 4, 5, 6 or 7, respectively) can be obtained.

It is considered that such excellent performance of the composite of the present invention can be obtained because phase separation upon forming a product of the composite hardly occurs in the present invention due to penetration of the high polymer molecule into the three network molecular structure of the polyamic acid used in the present invention.

EXAMPLE 28 AND COMPARATIVE EXAMPLE 8

This experiment was conducted in order to show the superiority of the composite of the present invention where a polyamic acid having a three-dimensional network molecular structure was used as component i) and a polyamide was used as high polymer component ii)(a) to the comparative composite wherein a polyamic acid having a linear molecular structure was used as component i) and a polyamide was used as high polymer component ii)(a).

Composite A of the present invention and Composite B for comparison were obtained in the same manner as Example 12 and Comparative Example 2, respectively, except that as component ii), a polyamide was used instead of the polyethersulfone and the temperature at the final imidation was 300° C.

The amounts of components used for the production of Composites A and B are shown in Table 5-1 below.

TABLE 5-1

| | Example 28<br>(Composite A) | Comparative<br>Example 8<br>(Composite B) |
|---|---|---|
| Polyamic Acid | | |
| Pyromellitic Acid Dianhydride | 1.210 g | 1.210 g |
| Paraphenylenediamine | 0.503 g | 0.599 g |
| 3,3',4,4'-Tetramino-biphenyl.4HCl.dihydrate | 0.176 g | — |
| N-methyl-2-pyrrolidone (solvent) | 20 g | 20 g |
| High Polymer Component | | |
| Polyamide*1 | 5.667 g<br>(75 wt %)*2 | 5.427 g<br>(75 wt %)*2 |
| N-methyl-2-pyrrolidone (solvent) | 50 g | 50 g |

*1: The chemical structure of the polyamide was as follows:

$$\text{-}(\text{CO-} \text{C}_6\text{H}_4 \text{-CONH-} \text{C}_6\text{H}_4\text{-O-} \text{C}_6\text{H}_4\text{-NH})_n\text{-}$$

The logarithmic viscosity number of the N-methyl-2-pyrrolidone solution containing 0.5 g/dl of the polyamide was 1.2 dl/g.
*2: The ratio of the amount of the polyamide in the composite based on the total weight of the solid components in the composite.

Composites A and B were subjected to evaluation of properties thereof in the same manner as Example 12 and Comparative Example 2, and the results are shown in Table 5-2 below.

TABLE 5-2

| | Example 28<br>(Composite A) | Comparative<br>Example 8<br>(Composite B) |
|---|---|---|
| Conditions of Polyamic acid composite gels*3 | ○ | X |
| Properties of Polyimide composite | | |
| Film property*4 | ○ | Δ |
| Glass transition temperature (°C.) | 280 | 275 |
| Tensile strength (Kgf/mm²) | 14 | 10 |
| Elastic modulus (Kgf/mm²) | 520 | 430 |
| Folding properties*5 | ○ | Δ |

*3: Gel conditions
○: gel had free-standing capability
X: no gelling
*4: Film properties
○: tough
Δ: slightly brittle
*5: Folding properties: State of the film after folding the film into two and returning
○: film had a wrinkle at the folded portion
Δ: film was extremely susceptible to be cut (film was partially cut or film barely kept the wrinkled state at the folded portion)

COMPARATIVE EXAMPLES 9, 10 AND 11

Comparative Examples 9, 10 and 11 were conducted in the same manner as Examples 21, 22 and 27, respectively, except that a polyamic acid having a linear molecular structure was produced instead of a polyamic acid having a three-dimensional network molecular structure.

The amounts of the components used for the production of the comparative composites and the results of the evaluation thereof are shown in Tables 6-1 and 6-2.

TABLE 6-1

| Comparative Example<br>(Corresponding Example) | 9<br>(21) | 10<br>(22) | 11<br>(27) |
|---|---|---|---|
| Polyamic acid monomers/Amounts (g) | | | |
| Acid anhydrides | | | |
| PMDA | — | 4.366 | 4.366 |
| BTDA | 1.786 | — | — |
| DSTA | — | — | — |

TABLE 6-1-continued

| Comparative Example (Corresponding Example) | 9 (21) | 10 (22) | 11 (27) |
|---|---|---|---|
| BPDA | — | — | — |
| Aromatic diamines | | | |
| PPD | 0.599 | 1.643 | 1.622 |
| MPD | — | — | — |
| 4,4'-DPE | — | 0.961 | — |
| 3,3'-DDS | — | — | — |
| BAPP | — | — | 2.706 |
| BAPS | — | — | — |
| BAPB | — | — | — |
| TPE-R | — | — | — |
| TPE-Q | — | — | — |
| Polyamino compound | | | |
| TAB | — | — | — |
| TABT | — | — | — |
| TADE | — | — | — |
| TADET | — | — | — |
| TRABT | — | — | — |
| Polymerization solvents[*1] | NMP 20 | DMF 50 | DMF 50 |
| Curable resin composition shown in Table 3-3 (g) | (1) 2.385 | (2) 6.970 | (7) 20.29 |
| Solvents (g)[*1] | NMP 20 | DMF 20 | DMF 30 |
| Polyamino compound molar ratio[*2] | 0 | 0 | 0 |
| Mixing ratio of curable resin composition (wt %) | 50 | 50 | 70 |

TABLE 6-1-continued

| Comparative Example (Corresponding Example) | 9 (21) | 10 (22) | 11 (27) |
|---|---|---|---|
| Acid value/amine value ratio | 1.00 | 1.00 | 0.93 |

[*1]: NMP, N-methyl-2-pyrrolidone; DMF, N,N-dimethylfomamide
[*2]: Mixing molar ratio of polyamino compound per 100 moles of acid anhydride

TABLE 6-2

| Comparative Example (Corresponding Example) | 9 (21) | 10 (22) | 11 (23) |
|---|---|---|---|
| Conditions of polyamic acid composite gels[*1] | X | X | X |
| Temperature at final imidization (°C.) | 300 | 300 | 300 |
| Properties of polyimide composites | | | |
| Film formability[*2] | ○ | ○ | ○ |
| 5% weight loss temperature (°C.)[*3] | 400 | 420 | 410 |
| Glass transition temperature (°C.)[*4] | 340 | 350 | 270 |
| Tensile strength (Kgf/mm$^2$) | 1 | 6 | 5 |
| Elastic modulus (Kgf/mm$^2$) | 351 | 340 | 350 |

[*1]: Gel condition: ○, gel having free-standing capability; X, no gelling
[*2]: Film formability: ○, film can be formed; X, film cannot be formed
[*3]: 5% weight loss temperature was evaluated by thermogravimetric analysis (nitrogen atmosphere); temperature increasing rate, 10° C./min
[*4]: Glass transition temperature was evaluated by thermogravimetric analysis (temperature increasing rate, 10° C./min; loading, 10 g)

By comparing the results of Examples 21, 22 and 27 and those of Comparative Examples 9, 10 and 11, respectively, it is clear that the composites of the present invention (Examples 21, 22 and 27) had a higher heat resistance and a higher elastic modulus than those of the composites of the Comparative Examples.

| Abbr. | Name | Chemical structure | Mol. wt. |
|---|---|---|---|
| PMDA | pyromellitic acid dianhydride | | 218 |
| BTDA | 3,3',4,4'-benzophenonetetra-carboxylic acid dianhydride | | 322 |
| DSTA | diphenylsulfone-3,3',4,4'-tetracarboxylic acid dianhydride | | 358 |
| BPDA | 3,3',4,4'-biphenyltetra-carboxylic acid dianhydride | | 294 |
| PPD | paraphenylenediamine | | 108 |

-continued

| Abbr. | Name | Chemical structure | Mol. wt. |
|---|---|---|---|
| MPD | methaphenylenediamine | H₂N-C₆H₄-NH₂ (1,3-) | 108 |
| 4,4'-DPE | 4,4'-diaminodiphenyl ether | H₂N-C₆H₄-O-C₆H₄-NH₂ | 200 |
| 3,3'-DDS | 3,3'-diaminodiphenyl sulfone | H₂N-C₆H₄-SO₂-C₆H₄-NH₂ (3,3'-) | 248 |
| BAPP | 2,2-bis[4-(4-aminophenoxy)-phenyl]propane | H₂N-C₆H₄-O-C₆H₄-C(CH₃)₂-C₆H₄-O-C₆H₄-NH₂ | 410 |
| BAPS | 2,2-bis[4-(4-aminophenoxy)-phenyl]sulfone | H₂N-C₆H₄-O-C₆H₄-SO₂-C₆H₄-O-C₆H₄-NH₂ | 432 |
| BAPB | 4,4'-bis(4-aminophenoxy)-biphenyl | H₂N-C₆H₄-O-C₆H₄-C₆H₄-O-C₆H₄-NH₂ | 368 |
| TPE-R | 1,3-bis(4-aminophenoxy)-benzene | H₂N-C₆H₄-O-C₆H₄(1,3)-O-C₆H₄-NH₂ | 292 |
| TPE-Q | 1,4-bis(4-aminophenoxy)-benzene | H₂N-C₆H₄-O-C₆H₄(1,4)-O-C₆H₄-NH₂ | 292 |
| TAB | 3,3',4,4'-tetraaminobiphenyl | (H₂N)₂-C₆H₃-C₆H₃-(NH₂)₂ | 214 |
| TABT | 3,3',4,4'-tetraaminobiphenyl.4HCl.dihydrate | (ClH.H₂N)₂-C₆H₃-C₆H₃-(NH₂.HCl)₂·2H₂O | 396 |
| TADE | 3,3',4,4'-tetraaminodiphenyl.ether | (H₂N)₂-C₆H₃-O-C₆H₃-(NH₂)₂ | 230 |
| TADET | 3,3',4,4'-tetraaminodiphenyl.ether.4HCl | (ClH.H₂N)₂-C₆H₃-O-C₆H₃-(NH₂.HCl)₂ | 376 |
| TADMT | 3,3',4,4'-tetraaminodiphenyl.methane.4HCl | (ClH.H₂N)₂-C₆H₃-CH₂-C₆H₃-(NH₂.HCl)₂ | 375 |

-continued

| Abbr. | Name | Chemical structure | Mol. wt. |
|---|---|---|---|
| TRABT | 1,2,4-triaminobenzene.2HCl | (benzene ring with NH₂·HCl, NH₂·HCl, NH₂ substituents) | 196 |

| Abbr. | Polymer | Chemical Structure | Glass Transition Temperature (°C.) |
|---|---|---|---|
| PES | Polyethersulfon | | 220~230 |
| PEI | Polyetherimide | | 216 |
| PAI | Polyamideimide | | 280 |
| PSu | Polysulfon | | 190 |
| PBI | Polybenzimidazole | | 420 |
| PC | Polycarbonate | | 153~156 |
| PI | Polyimide (Larc-TPI) | | 260~270 |
| PAa | Polyamic Acid (PMDA/PPD) | | 80–100 |

| Abbr. | Polymer | Chemical Structure | Glass Transition Temperature (°C.) |
|---|---|---|---|
| | ZYTEL (Nylon 6) | ⁺NH—C₅H₁₀—CO⁺ₙ | 53 |

Chemical names and chemical structures of curable resins used in Examples of the present invention are shown below.

MY-720  N,N,N',N'-Tetraglycidyldiamino diphenyl methane

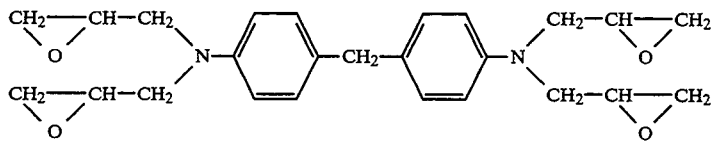

EPIKOTE  Bisphenyl A Epoxy Resin

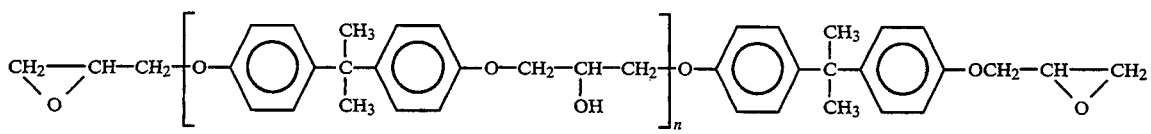

BT-2160  A reaction product of triazine resin and bismaleimide resin

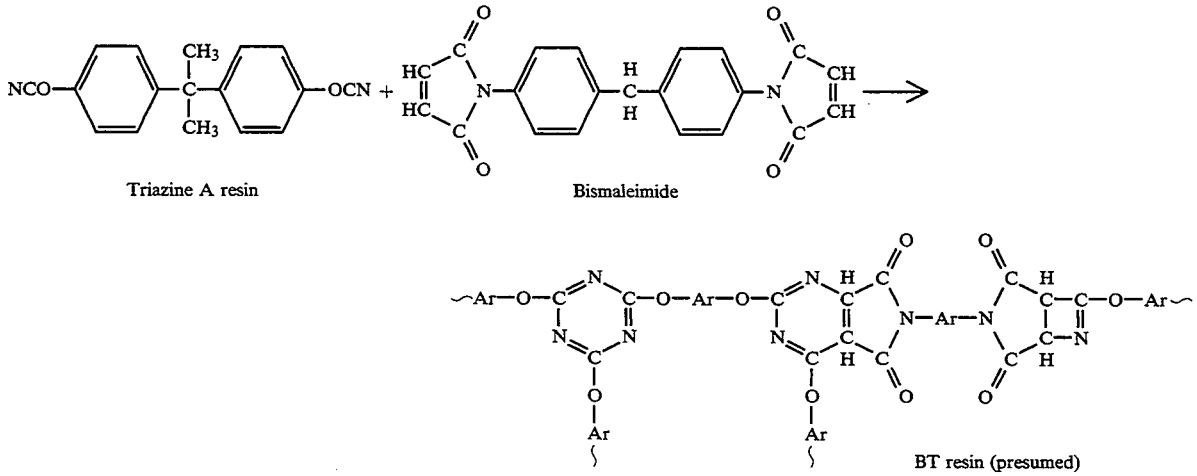

Lipoxy SP-1506  Bisphenyl A epoxy acrylate

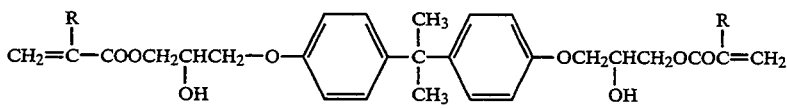

PR-9480  Phenol resin

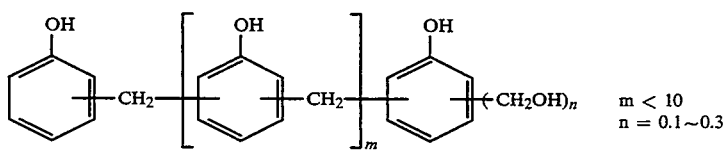

m < 10
n = 0.1~0.3

SK Resin  Reaction product of a polycondensed aromatic compound and a crosslinking agent
    COPNA                                     Crosslinking agent

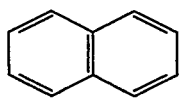

CH₂O

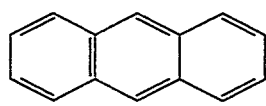
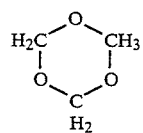
-continued
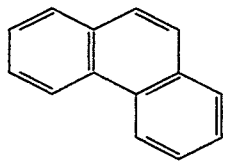
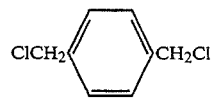
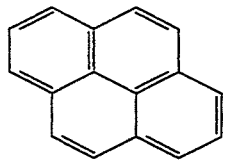
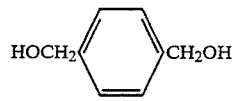
Pitches
p-Xylilene glycol
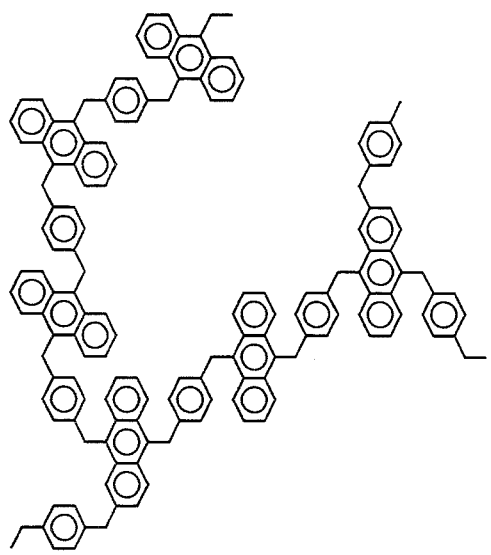
Anthracene resin
(an example of a chemical
structure model of a COPNA)
PSP 6022PL    Polystyrylpyridine
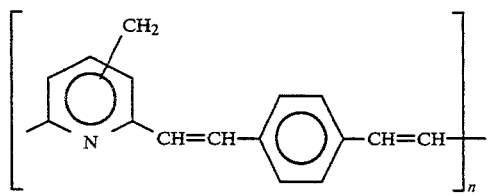
MP-2000  Polyfunctional maleimide

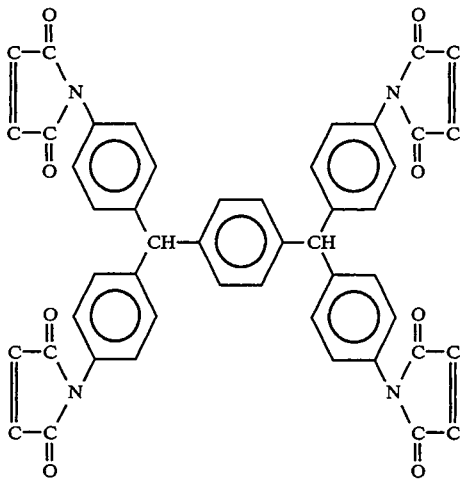

Compimide 796 Bismaleimide Resin

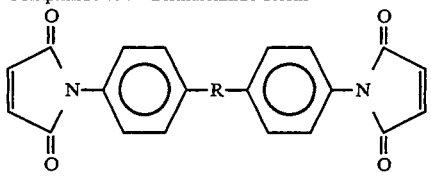

TM123 4,4'-bis(o-propenylphenoxy)benzophenone

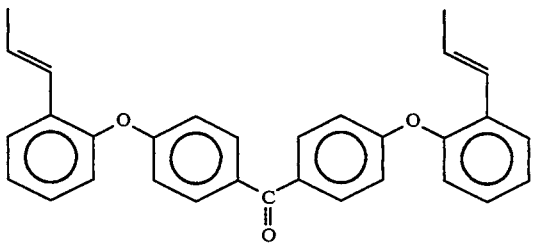

While the invention has been described in detail and with reference to specific embodiments thereof, it will be apparent to one skilled in the art that various changes and modifications can be made therein without departing from the spirit and scope thereof.

What is claimed is:

1. A polyimide resin composite produced by dehydrating and cyclizing a polyamic acid in a polyamic acid composite comprising i) a polyamic acid having three dimensional network molecular structure obtained by a ring-opening polyaddition reaction of a tetracarboxylic acid dianhydride with an aromatic diamine and a tri- or tetramino compound and ii) (a) a high polymer component having a different molecular structure from the polyamic acid, which is dispersed in the three dimensional network molecular structure of the polyamic acid and of which molecular chains are interpenetrated with molecular chains of the polyamic acid or (b) a curable resin composition which is dispersed in the three dimensional network molecular structure of the polyamic acid and which is capable of forming a cured resin of which molecular chains are interpenetrated with molecular chains of the polyamic acid.

2. The polyimide resin composite of claim 1, wherein said component or composition ii) is said ii)(a) high polymer component.

3. The polyimide resin composite as claimed in claim 1, wherein said component or composition ii) is said ii) (b) curable resin composition.

4. A polyimide resin composite as claimed in claim 1, wherein said tetracarboxylic acid dianhydride, aromatic diamine and tri- or tetra-amino compound are reacted in a molar ratio of 100/(50−100)/(2−25).

5. A polyimide resin composite as claimed in claim 1, wherein said tetracarboxylic acid dianhydride is selected from the group consisting of a tetracarboxy benzene dianhydride, a tetracarboxy dianhydride of a compound having 2 to 5 condensed benzene rings, compounds represented by formula (I), and substituted compounds represented by formula (I) which are substituted with a substituent selected from substituents which do not adversely affect the polyaddition reaction and deteriorate characteristics of the composite:

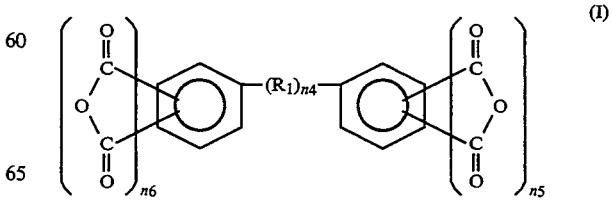

(I)

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, $n_4$ is 0 or 1; $n_5$ is 0 or 1; and $n_6$ is 1 or 2, provided that the sum of $n_5$ and $n_6$ is 2.

6. A polyimide resin composite as claimed in claim 1, wherein said aromatic diamine is selected from the group consisting of a phenylene diamine, a diamino pyridine, a diamino compound having 2 to 8 condensed benzene rings, dihydrazide, compounds represented by formula (II), and substituted compounds represented by formula (II) which are substituted with a substituent selected from substituents which do not adversely affect the polyaddition reaction and deteriorate characteristics of the composite:

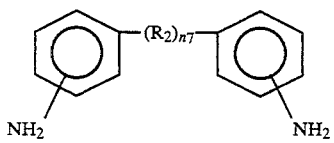
(II)

wherein $R_2$ represents —O—, —CO—, —SO$_2$—, —SO—, a phenylene group, an alkylene group, a phenylene alkylene group, a phenylene dialkylene group, or

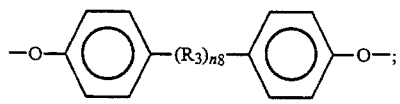

$n_7$ is 0 or 1; $R_3$ represents —O—, —CO—, —SO$_2$—, —SO—, a phenylene group, an alkylene group, a phenylene alkylene group, or a phenylene dialkylene group, and $n_8$ is 0 or 1.

7. A polyimide resin composite as claimed in claim 1, wherein said tri- or tetra-amino compound is selected from the group consisting of compounds represented by formula (III) or (IV):

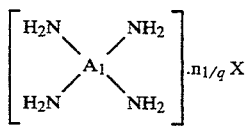
(III)

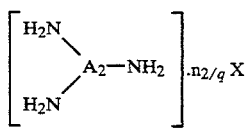
(IV)

wherein $A_1$ represents

$A_2$ represents

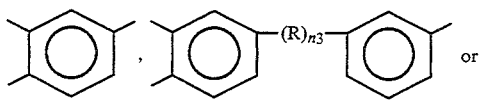

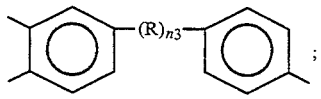

$n_1$ is 0 or an integer of 1 to 4; $n_2$ is 0 or an integer of 1 to 3; X represents an acid; q is the base number of the acid; R represents —O—, —CH$_2$—, —CO— or —SO$_2$—; and $n_3$ is 0 or 1.

8. A polyimide resin composite as claimed in claim 7, wherein said tri- or tetra-amino compound comprises at least one acid addition salt of said compound represented by formula (III) or (IV), wherein the acid of the acid addition salt is selected from the group consisting of salts of p-toluenesulfuric acid, picric acid and hydrochloric acid.

9. A polyimide resin composite as claimed in claim 1, wherein said high polymer component is at least one compound selected from the group consisting of polyamic acids, polyimides, polysulfones, polybenzimidazoles, polybenzoxazoles, polybenzothiazoles, polyamides, polypeptides, polyesters, polycarbonates and polyacrylonitriles.

10. A polyimide resin composite as claimed in claim 1, wherein said component (a) of (ii) or composition (b) of (ii) is incorporated in an amount of 1 to 80% by weight based on the polyamic acid composite.

11. A polyimide resin composite as claimed in claim 1, wherein said polyamic acid has a molecular weight of from 10,000 to 300,000.

12. A polyimide resin composite as claimed in claim 1, wherein said tetracarboxylic acid dianhydride is selected from pyromellitic dianhydride, benzophenonetetracarboxylic acid dianhydride, biphenyltetracarboxylic acid dianhydride and mixtures thereof.

13. A polyimide resin composite as claimed in claim 1, wherein said polyamic acid composite is in the form of a free-standing gel.

14. The process for producing a polyimide composite comprising the steps of:
(a) preparing a polyamic acid composite comprising
i) a polyamic acid having three dimensional network molecular structure obtained by a ring-opening poly-addition reaction of a tetracarboxylic acid dianhydride with an aromatic diamine and a tri- or tetramino compound and ii) (a) a high polymer component having a different molecular structure from the polyamic acid, which is dispersed in the three dimensional network molecular structure of the polyamic acid and of which molecular chains are interpenetrated with molecular chains of the polyamic acid or (b) a curable resin composition which is dispersed in the three dimensional network molecular structure of the polyamic acid and which is capable of forming a cured resin of which molecular chains are interpenetrated with molecular chains of the polyamic acid, and
(b) dehydrating and cyclizing said polyamic acid to produce a polyimide resin composite.

15. The process as claimed in claim 14, wherein said dehydrating and cyclizing step is conducted after drying the reaction product to remove the solvent used for preparation of the polyamic acid composite.

16. The process as claimed in claim 14, wherein said dehydrating and cyclizing step is conducted by heating said polyamic acid in a form of a gel.

17. The process as claimed in claim 16, wherein said polyamic acid gel contains 60 to 97% by weight of an organic solvent.

18. The process as claimed in claim 14, wherein said dehydrating is conducted using an acid anhydride and said dehydrating and cyclizing reaction is conducted in the presence of an amine as a catalyst.

19. The process of claim 14, wherein said component or composition ii) is said ii) (a) high polymer component.

20. The process of claim 14, wherein said component or composition ii) is said ii)(b) curable resin composition.

* * * * *